United States Patent
Wachter et al.

(10) Patent No.: US 7,522,918 B2
(45) Date of Patent: Apr. 21, 2009

(54) METHOD AND SYSTEM FOR EVALUATING RADIO COVERAGE

(75) Inventors: John Robert Wachter, Forest, VA (US); Kenneth Alan Ballard, Forest, VA (US); Joseph D. Pociluyko, Forest, VA (US)

(73) Assignee: CTA Communications, Inc., Lynchburg, VA (US)

( * ) Notice: Subject to any disclaimer, the term of this patent is extended or adjusted under 35 U.S.C. 154(b) by 480 days.

(21) Appl. No.: 11/428,855

(22) Filed: Jul. 6, 2006

(65) Prior Publication Data

US 2007/0010241 A1  Jan. 11, 2007

Related U.S. Application Data

(60) Provisional application No. 60/697,509, filed on Jul. 8, 2005.

(51) Int. Cl.
  *G06F 19/00* (2006.01)
(52) U.S. Cl. .................................. 455/423; 455/456.1
(58) Field of Classification Search ............. 455/456.1, 455/422.1, 423, 424, 456.6, 12.1, 13.1, 13.2; 701/36, 200, 208, 216; 340/425.5, 435, 436; 342/358, 375
See application file for complete search history.

(56) References Cited

U.S. PATENT DOCUMENTS

| | | | |
|---|---|---|---|
| 5,752,164 A | 5/1998 | Jones | |
| 5,987,320 A | 11/1999 | Bobick | |
| 6,081,717 A | 6/2000 | Shah et al. | |
| 6,625,135 B1 | 9/2003 | Johnson et al. | |
| 6,631,267 B1 | 10/2003 | Clarkson et al. | |
| 6,700,953 B1 | 3/2004 | Maurer et al. | |
| 6,711,404 B1 | 3/2004 | Arpee et al. | |
| 2002/0167937 A1 | 11/2002 | Goodman | |

*Primary Examiner*—Sam Bhattacharya
(74) *Attorney, Agent, or Firm*—Woods Rogers PLC; Peter E. Rosden

(57) ABSTRACT

A system and method for testing radio coverage of a land mobile radio system. The system configuration generally employs a fixed unit, a mobile unit and the two-way radio system (not part of the invention) subject to testing. The test system and method are compatible with any land-mobile radio system (conventional, trunked, using proprietary or standards-based protocols, FDMA or TDMA) operating in any frequency band. One of three methods may be selected to perform testing at any one time: continuous testing, grid testing or receive-only testing. In the continuous and grid modes, both the talk-out and talk-in paths are measured. Test results are recorded in a computer file after being converted to a digital format, and are compared to an original "reference file" via the Perceptual Evaluation of Speech Quality (PESQ) algorithm as defined by ITU-T standard P.862. The PESQ output is then converted to a Delivered Audio Quality (DAQ) score by application of an empirical set of weighting factors to certain of the PESQ parameters.

32 Claims, 12 Drawing Sheets

FIG. 10

| PESQ (COMBINED) | DAQ |
|---|---|
| -0.500 - 0.906 | 0.00 |
| 0.907 - 0.958 | 0.10 |
| 0.959 - 1.011 | 0.20 |
| 1.012 - 1.063 | 0.30 |
| 1.064 - 1.116 | 0.40 |
| 1.117 - 1.169 | 0.50 |
| 1.170 - 1.222 | 0.60 |
| 1.223 - 1.274 | 0.70 |
| 1.275 - 1.327 | 0.80 |
| 1.328 - 1.380 | 0.90 |
| 1.381 - 1.433 | 1.00 |
| 1.434 - 1.485 | 1.10 |
| 1.486 - 1.538 | 1.20 |
| 1.539 - 1.591 | 1.30 |
| 1.592 - 1.644 | 1.40 |
| 1.645 - 1.696 | 1.50 |
| 1.697 - 1.749 | 1.60 |
| 1.750 - 1.802 | 1.70 |
| 1.803 - 1.854 | 1.80 |
| 1.855 - 1.907 | 1.90 |
| 1.908 - 1.960 | 2.00 |
| 1.961 - 2.013 | 2.10 |
| 2.014 - 2.065 | 2.20 |
| 2.066 - 2.118 | 2.30 |
| 2.119 - 2.171 | 2.40 |
| 2.172 - 2.224 | 2.50 |
| 2.225 - 2.276 | 2.60 |
| 2.277 - 2.329 | 2.70 |
| 2.330 - 2.382 | 2.80 |
| 2.383 - 2.434 | 2.90 |
| 2.435 - 2.487 | 3.00 |
| 2.488 - 2.540 | 3.10 |
| 2.541 - 2.593 | 3.20 |
| 2.594 - 2.645 | 3.30 |
| 2.646 - 2.698 | 3.40 |
| 2.699 - 2.751 | 3.50 |
| 2.752 - 2.804 | 3.60 |
| 2.805 - 2.856 | 3.70 |
| 2.857 - 2.909 | 3.80 |
| 2.910 - 2.962 | 3.90 |
| 2.963 - 3.015 | 4.00 |
| 3.016 - 3.067 | 4.10 |
| 3.068 - 3.120 | 4.20 |
| 3.121 - 3.173 | 4.30 |
| 3.174 - 3.225 | 4.40 |
| 3.226 - 3.278 | 4.50 |
| 3.279 - 3.331 | 4.60 |
| 3.332 - 3.384 | 4.70 |
| 3.385 - 3.436 | 4.80 |
| 3.437 - 3.489 | 4.90 |
| 3.490 - 4.500 | 5.00 |

| DROPOUTS | DAQ MULTIPLIER |
|---|---|
| 0 - 9 | 1 |
| 10 - 19 | 0.75 |
| 20 - 29 | 0.5 |
| > 29 | 0 |

METHOD AND SYSTEM FOR EVALUATING RADIO COVERAGE

CROSS-REFERENCE TO RELATED APPLICATIONS

This application claims the benefit of U.S. provisional application Ser. No. 60/697,509, filed Jul. 8, 2005, which is incorporated by reference herein in its entirety.

TECHNICAL FIELD

The subject invention relates generally to a method and system for measuring and testing two-way mobile radio coverage over a predetermined geographic area. More particularly, this invention concerns a method implemented through hardware and software for providing independent verification and validation of analog and digital land mobile radio systems using automated voice quality measurements during radio coverage testing. The method is also useful for determining the effects of noise or interference on the communications channel.

BACKGROUND OF THE INVENTION

A problem that continues to plague the land mobile radio (LMR) industry, its markets, and its end-users, is the misinterpretation of data resulting from coverage acceptance testing. The earliest technique used was a "voice test" where radio calls were made to and from selected locations in the service area. A standardized circuit merit (CM) scale of values ranging from 0 (unusable signal) to 5 (clear audio, speech easily understood) was used to score the test. Performance of the radio in both the talk-out (base-to-mobile) and talk-back (mobile-to-base) paths could simply be tested with a pair of test calls. If the persons performing the test were unable to reach a consensus about the score for the test, a mean opinion scoring (MOS) method could be applied where two or more individuals independently evaluate each call and assign a score. The final score ascribed to the test point would then be the average (or mean) score for the team. Since tests conducted at a stationary location do not include fading effects, test procedures were sometimes written to require that tests be performed in a moving vehicle.

Since circuit merit scoring involves subjective opinions concerning the audio quality of radio calls, an objective measurement method evolved utilizing signal strength as the pass/fail metric. In this method, the relationship between signal strength and delivered audio quality (DAQ) was assumed based generally on experience, and an appropriate threshold value of signal level was agreed upon as the boundary between acceptable and unacceptable performance. The establishment of a threshold signal level made certain assumptions about received signal strength and circuit merit that were generally true, but did not take into account individual receiver sensitivity or performance, multi-path effects, actual local noise, and others. The correlation was then "generally" good for comparable products manufactured by the major LMR equipment suppliers. The correlation held for analog narrow-band frequency modulation (FM) technology, but became less accurate when other forms of modulation were introduced.

It quickly became apparent that changes in signal strength due to multi-path fading when a vehicle is in motion can cause changes in signal strength of 20 dB or more within a few feet. The solution was to record signal strength from a continuously keyed base station over a distance while the test vehicle is in motion. The use of strip charts with an analog receiver in the test vehicle was an early implementation of this method. The value assigned to each test location was determined by either using the mean signal level (difficult to calculate from a strip chart) or the median signal level, which was straightforward and did not require calculations. The test location associated with the data was manually marked on a map at the time of the test.

With the advent of compact laptop computers and the deployment of the Global Positioning System (GPS) network of satellites in Earth orbit, the test equipment and data collection methods became more sophisticated. Test location could be determined with the use of a mobile GPS receiver, and recorded with the data file in the mobile laptop computer. The collection of signal strength data changed from the use of a strip-chart recorder to discrete samples of signal strength.

Analogous to the strip-chart recording, however, engineers realized that a single measurement would not be representative due to the effects of multi-path fading. The solution was to rapidly sample signal strength over a reasonable distance (such as 40 wavelengths), and record several hundred discrete samples of the signal strength. While the laptop computer could store all of the discrete samples (if sufficient disk space was available), typically the samples would either be averaged or analyzed for the median value. Either the mean or median value would be recorded and stored in association with the longitude and latitude position in the data file.

Calibration of the test equipment and the mobile radio setup is used to establish baseline signal strength, from which appropriate loss factors can be applied to derive or extrapolate performance for a portable radio (rather than the test mobile unit), as well as simulating portable use inside buildings of varying loss characteristics (e.g., light, medium or heavy buildings). Rather than introducing attenuators into the antenna feed lines, these loss factors can be accommodated by simply post-processing the resultant data files (i.e., subtracting the loss factor from the measured signal strength value).

Over the past ten years, the major land mobile radio suppliers have developed proprietary methods and tools for acceptance testing of radio systems that they field. Coverage test procedures, equipment and processing software have been independently developed by each company and applied uniquely to their system and equipment. Some vendors perform drive tests with continuous recording of data over the drive route, while others divide the service area into test grids and then record the coverage data on a sampled basis as they enter each grid during the drive test.

With the advent of digital voice modulation in land mobile radio systems, the method for coverage testing has been modified to include bit error rate (BER) measurements. Some in the LMR industry maintain that signal strength measurements cannot be directly correlated with BER, and, therefore, signal strength is not universally accepted as a valid measurement technique for digital voice coverage. However, it should be clear that BER measurements are not direct tests of the understandability of voice calls or of audio quality, and in actual practice the relationship can vary depending on the protocols used to convert between voice and the digital signal.

There are fundamental problems with all of the coverage test methods described above. For the audio quality test (circuit merit or delivered audio quality), there is subjective judgment by the people listening to the voice calls—what one person considers acceptable under one set of conditions as a DAQ 3 or 4, another person, under another set of conditions may judge to be unintelligible and unacceptable. With both the signal strength and BER tests, there is an assumed experientially derived correlation between the parameter being measured and the audio quality of the voice delivered to the listener. In both of these tests, the performance of the radio receiver is not taken into account, since the correlation made a general assumption concerning "typical" receiver capabilities. In the BER tests, the bit pattern transmitted and used for comparison at the receiving test unit is raw, i.e. not processed data. This means that the BER measurements do not include the voice/data conversion protocols—i.e., the capabilities of the manufacturer's vocoder or forward error correcting code, which can either contribute errors or correct errors in the digital stream. In addition, manufacturers infer a voice quality (delivered audio quality or DAQ) from their BER measurements. And in both BER and signal level coverage tests, the only path generally tested is "talk-out"—i.e., from base-to-mobile—making the tests unidirectional. The "talk-back" (mobile-to-base) path is more difficult to set up for automated testing, and is therefore seldom done—the assumption is usually made that the two paths are reciprocal, equivalent and "balanced", meaning that both directions of the call have the same coverage footprint over the service area. This assumption can be reasonable in some situations, for example in a system where tower-top pre-amplifiers are utilized to balance talk-out and talk-back paths, but is probably a poor assumption in others, for example in systems where tower-top amplifiers are not practical. Systems built for the VHF (136-174 MHz) and UHF (406-512 MHz) frequencies are generally balanced where high-power mobile units are used, but are not balanced in the more common portable-based systems. Tower-top amplifiers are not effective at these frequencies due to the presence of high ambient noise. For digital systems, there is no direct means of post-processing BER data to extrapolate to other conditions. BER tests are only valid for the talk-out path under the existing conditions when measured, and cannot be easily related to the coverage for talk-back communications.

Thus, current automated LMR voice system field testing relies on measuring technical characteristics of the system, either signal level, BER, or a combination of the two over a distance of 40 to 100 wavelengths. These characteristics do not necessarily correspond directly to the understandability of the radio communications since there are additional factors involved in human communications. A direct human understandability test on the other hand is very time consuming, labor intensive, and not replicable from person to person or from time to time since there is a significant subjective element that differs with the perception of the test subject.

Current systems and methods implementing the Perceptual Evaluation of Speech Quality (PESQ) algorithms are also not capable of checking for missing or blank audio in recorded audio files and filtering such data from further processing.

What is needed is an automated process that emulates human communications, but removes human subjectivity, such as is found in MOS-based tests, from the test process. The desired method should include both the talk-out (base-to-mobile) and talk-back (mobile-to-base) directions, since a useable communications path must include the capability for two-way conversations. Furthermore, the test method should include a measurement of the entire radio system's processing capability (e.g., analog-to-digital conversion, digital-to-analog conversion, voice compression, forward error correcting code, receiver sensitivity, etc.) in the measurement. The method should be flexible enough to simulate the conditions that a radio user would experience, such as making or receiving calls with a portable clipped on his belt while inside a building with a specified typical loss factor. The method should also include the concurrent measurement of received signal strength to facilitate the identification of local conditions (e.g., noise, interference) that may affect the communications channel. Yet another function that should be provided by such a system and method is to check for and filter out missing or blank audio data. And, finally, the test method should be insensitive to proprietary control data, vocoders and other vendor-specific protocols. Ideally, the method should be non-invasive to the communications system under test: it should not require integrated access to the radio system components, instead relying only on typical interfaces presented by all systems (e.g., audio, microphone, push-to-talk, antenna, etc.). By being non-invasive, the method would facilitate independent verification and validation by a third party, and not rely on participation by the system manufacturer or provider.

SUMMARY OF THE INVENTION

This invention relates to a method and system for evaluating radio coverage of a radio system based on either continuous, grid or receive-only testing modes using a fixed location apparatus and a mobile location apparatus. In continuous testing, after software startup and initialization and GPS synchronization of components, two-way testing commences. The mobile location apparatus transmits a two-portion message comprised of a preamble portion followed by an audio portion to the fixed location apparatus by way of the radio system. Each portion has a known, fixed length. The received audio portion is recorded, stored together with unique identifying information and assigned a DAQ score based on a comparison with an audio reference file. The fixed location apparatus then transmits another two-part message back to the mobile location apparatus, the audio portion of which is similarly recorded, stored and scored. This process is repeated until all of the sites desired to be tested have been tested or until a specified period of time has elapsed. In grid testing, an analogous two-way testing process is used except that the subject of testing is a grid of equally sized, rectangular cells, each of which has a known geographical location and/or grid index, and test results are linked to each cell through that cell's geographical location and/or grid index. In receive-only testing, one-way testing is employed in which a two-portion message is transmitted from the fixed location apparatus to the mobile location apparatus where the received audio portion is recorded, scored and stored. In receive-only testing mode, an operator may elect to use either continuous-type or grid-type testing.

BRIEF DESCRIPTION OF THE DRAWINGS

The foregoing and other objects, aspects and advantages of the invention will be better understood from the following detailed description of the invention with reference to the drawings, in which

FIG. 10 illustrates two look-up tables used in calculating a DAQ score.

DETAILED DESCRIPTION OF THE PREFERRED EMBODIMENT

Figure 1:
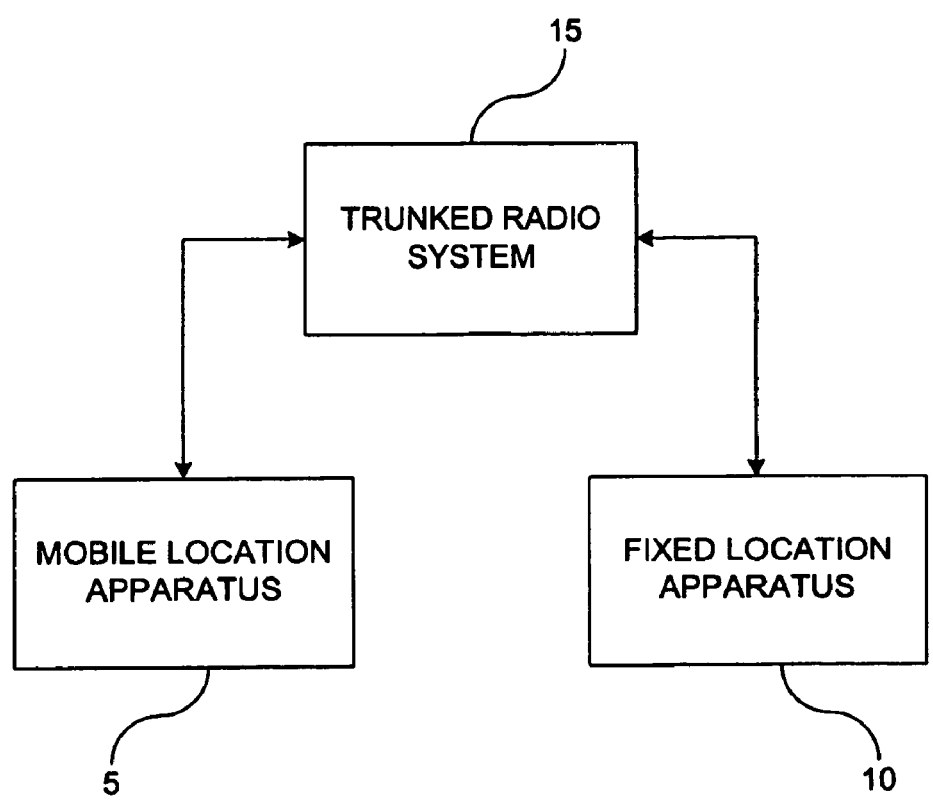
FIG. 1 presents the major components of the system of this invention in block diagram form.

For a more detailed understanding of the invention, reference is first made to FIG. 1 of the drawings in which the invention is presented in block diagram form as including a Mobile Apparatus 5 at a mobile location and a Fixed Apparatus 10 at a stationary location. In order to establish and evaluate radio coverage provided by two-way Radio System 15, both apparati 5 and 10 must be able to communicate with Radio System 15. Radio System 15 may be either a single repeater site or multiple repeater sites that are part of a wide-area (e.g., simulcast) trunked or conventional radio system. In the following disclosure, use of a trunked configuration for Radio System 15 is assumed. The disclosure applies similarly to other configurations, with minor adaptations. As explained below, in a trunked configuration, the radio has to interact with a site controller via a control channel, and recording of a call must await assignment of a working channel for the call. In a conventional, non-trunked configuration, there is no site controller or control channel, and the working channel is the selected channel setting on the radio. In both configurations, the system of the invention functions transparently without regard to the radio system under test or the protocol used.

Figure 2:
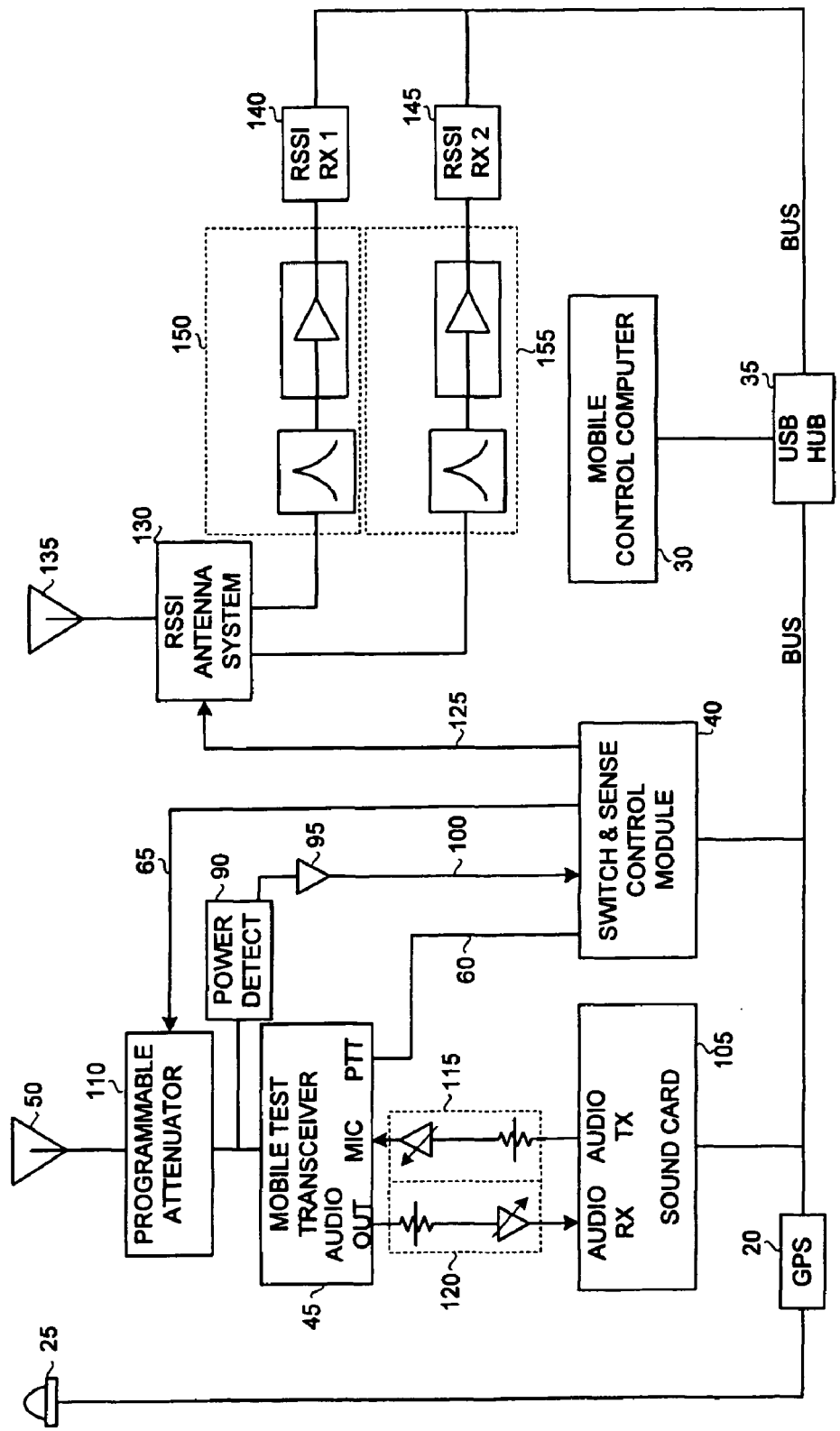
FIG. 2 presents in schematic diagram form the Mobile Apparatus of the invention.

FIG. 2 depicts in schematic form the elements of Mobile Apparatus 5. First GPS receiver subsystem 1050 receives signals from the GPS satellite system via first GPS antenna 25 and provides latitude, longitude, elevation, time, and speed data to Mobile control computer 30 via first USB Hub 35. The GPS time is used to synchronize the time clock on Mobile control computer 30 at the start of testing on each day. The GPS latitude and longitude coordinates are used to record and plot vehicle position on a computerized map, and to determine whether an area has already been tested. The GPS-derived vehicle speed is used as a condition for starting a test sequence—the test vehicle must exceed the minimum threshold set by the user (typical value is 5 mph). First GPS receiver subsystem 1050 is never disconnected or turned "off"; data is recorded at certain steps in the test process and used to identify the time and location of the Mobile Apparatus 5.

Mobile control computer 30 is typically a laptop personal computer (PC) capable of running software for a graphical user interface and controlling all of the attached hardware peripherals as well as collecting, processing and storing data used for determining whether a coverage area passes or fails, as discussed below. Any computing device that can perform all of these functions may be used. The computer should have at least a Pentium 4 processor or equivalent, 512 MB of RAM, 40 GB hard drive and minimum clock speed of 700 MHz.

When a test is initiated, Mobile control computer 30 sends a control command via first USB Hub 35 to first switch and sense control module 40. The control command causes relay contacts in first switch and sense control module 40 to close from a normally open position and connect the push-to-talk (PTT) input of Mobile test transceiver 45 to ground via first PTT control line 60. This places Mobile test transceiver 45 in the transmit mode.

Mobile test transceiver 45 is a mobile radio compatible with Radio System 15. Mobile test transceiver 45 transmits and receives radio frequency (RF) signals via Mobile transceiver antenna 50. Programmable attenuator 55 is installed in series with Mobile transceiver antenna 50. Programmable attenuator 55 is used to simulate portable radios operating outdoors or inside light, medium or heavy buildings. It is also used to accommodate imbalanced systems (systems with unequal talk-out and talk-back coverage). When the mobile test system travels through a grid or area marked for in-building coverage, Mobile control computer 30 sends a signal via first USB Hub 35 to first switch and sense control module 40, which in turn sets Programmable attenuator 55 to the attenuation that is representative of the type of buildings located in the test area. A single-pole double-throw (SPDT) relay contact in first switch and sense control module 40 controls the Programmable attenuator 55 via Programmable attenuator control line 65.

Since Mobile test transceiver 45 and a portable radio have different transmit power capability, yet similar receiver sensitivity, the operating characteristics of the two radios will be different. If Trunked Radio System 15 is balanced for mobile operation—i.e., the system gain for the talk-in (mobile-to-base) path is equal to the gain for the talk-out (base-to-mobile) path, then we know that it will be unbalanced for portable operation (since mobiles have a higher transmit power than portables). Programmable attenuator 55 can accommodate unbalanced systems where the loss (attenuation) experienced in transmit and receive directions are, in general, different. Three attenuators and a dual circulator are included in the detail for Programmable attenuator 55.

Figure 2A:
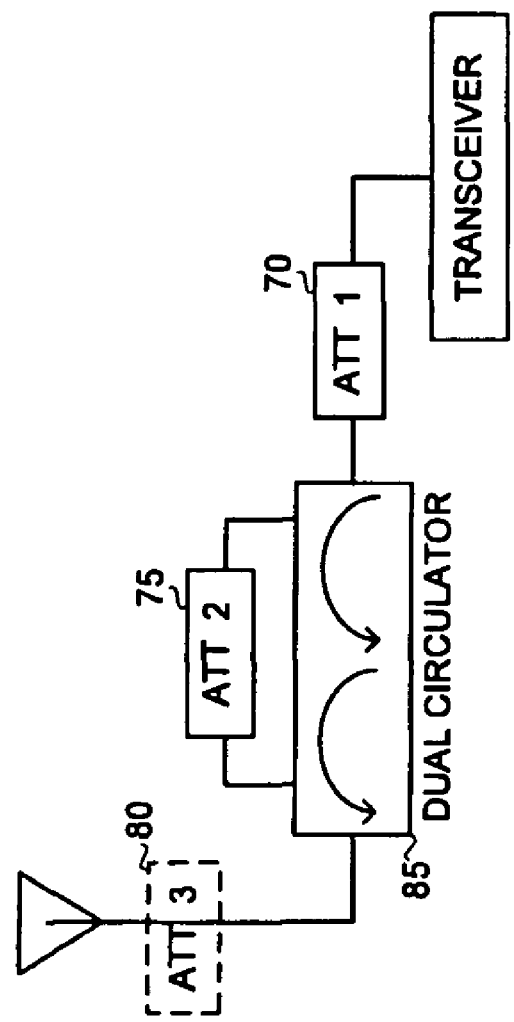
FIG. 2A presents details of the programmable attenuator of this invention.

FIG. 2A shows in greater detail the structure of programmable attenuator 55 which includes four primary elements. First Attenuator 70 is programmed to simulate portable receive sensitivity degradation due to portable radio antenna loss. If the portable antenna is located at either the hip level (i.e., clipped to the belt) or at shoulder level (with a public safety speaker/microphone), first Attenuator 70 will also include losses due to the human body. If the test Zone is designated for mobile coverage, first Attenuator 70 is programmed to approximately 0 dB (no loss). Second Attenuator 75 is programmed to simulate the difference in transmitter power between the Mobile test transceiver 45 and a portable radio. If the test Zone is designated for mobile coverage, second Attenuator 75 is programmed to approximately 0 dB. Third Attenuator 80 is programmed to simulate the specified building loss in the test Zone. Dual Circulator 85 accommodates the requirement for imbalance by providing a transmit path through second Attenuator 75 and a receive path that bypasses second Attenuator 75. Thus, second Attenuator 75 comprises the difference in system gain between the talk-in and talk-out paths.

This invention can be used with two general types of systems: trunked and conventional. In a trunked system, the Mobile Test Transceiver requests a channel assignment from Radio System 15 for the call. A computer (typically called Site Controller) within Radio System 15 determines what channels are idle and available for the call, then assigns the selected channel and notifies the calling radio (Mobile test transceiver 45 in this case). Upon receipt of the channel assignment, Mobile test transceiver 45 begins transmitting on the appropriate frequency. In a conventional system, there is no Site Controller and there are no channel assignments to be made. When a test is initiated, Mobile control computer 30 sends a control command via first USB Hub 35 to first switch and sense control module 40. The control command causes relay contacts in first switch and sense control module 40 to close from a normally open position and connect the PTT input of Mobile test transceiver 45 to ground via first PTT control line 60. This places Mobile test transceiver 45 in the transmit mode. After Mobile test transceiver 45 transmits for a pre-determined period of time, Mobile control computer 30 recognizes that Mobile test transceiver 45 is operating and that it is clear to transmit a test audio message via first sound card 105 and Mobile test transceiver 45. The period of time that the Mobile control computer 30 waits in a conventional system can be set to an arbitrarily small number since there is no waiting period for channel assignment. As indicated above, the preferred embodiment discloses use of the invention in a trunked system. Consequently, Mobile test transceiver 45 sends a channel request and must wait for a channel grant from trunked Radio System 15 before it can start transmitting.

In order for the system to know that a channel has been assigned to the test call, Mobile control computer 30 monitors the output from First power detect circuit 90 and First power detect preamplifier 95 via first switch and sense control module 40. First power detect circuit 90 in conjunction with First power detect preamplifier 95 converts RF power to a continuous voltage that represents a logic "1". A logic "1" indicates that RF power is present during a transmission. A logic "0" indicates the absence of RF power or no transmission. An isolated sensing input on first switch and sense control module 40 receives logic "1" and "0" signals from first power detect line 100. First switch and sense control module 40 sends that information to Mobile control computer 30 via first USB Hub 35. After Mobile test transceiver 45 transmits for a predetermined period of time (typically 400 ms), Mobile control computer 30 recognizes that Mobile test transceiver 45 is continuously transmitting. This means a working channel has been assigned to the test call. Mobile control computer 30 then signals that it is clear to transmit a test audio message via First sound card 105 and Mobile test transceiver 45 through Radio System 15 to Stationary test transceiver 110 (shown in FIG. 3).

Sound Card 60 converts a digital audio file, stored on Mobile control computer 30, into an analog audio output that is routed to the Mobile test transceiver 45 microphone input. First transmit audio level control 115 is used to adjust the audio output level of the test message from First sound card 105 into the microphone input of Mobile test transceiver 45. First sound card 105 is controlled by Mobile control computer 30 through first USB Hub 35.

During the mobile receive portion of the test, the test message is received by Mobile test transceiver 45. First receive audio level control 120 is used to adjust the radio audio output level from the Mobile test transceiver 45 to the input of the external First sound card 105. First sound card 105 converts analog audio from Mobile test transceiver 45 into a digital audio file that is stored on Mobile control computer 30.

RSSI antenna control line 125 provides logic via a relay in first switch and sense control module 40 to RSSI antenna system 130. RSSI antenna system 130 contains a relay to connect and disconnect RSSI antenna 135 from first RSSI receiver 140 and second RSSI receiver 145. RSSI antenna 135 is disconnected when Mobile test transceiver 45 is transmitting. The control logic is activated by Mobile control computer 30 which sends the control logic to first switch and sense control module 40 via first USB Hub 35. First RSSI Receiver Filter and Preamplifier Stage 150 includes a tunable bandpass filter and RF preamplifier. The bandpass filter is used to keep unwanted RF signals from saturating the preamplifier. The bandpass filter is center-tuned on the frequency of interest. If several frequencies of interest are required to be monitored, then the tunable bandpass filter can be removed from the preamplifier stage. The purpose of the preamplifier is to improve the dynamic range of first RSSI Receiver 140. Similar functions are performed by second RSSI Receiver Filter and Preamplifier Stage 155 with regard to second RSSI receiver 145. First RSSI receiver 140 records the RSSI of the RF signal of interest that is transmitted to Mobile test transceiver 45 from Radio System 15. Second RSSI receiver 145 records the RSSI of other RF signals that are not associated with the RF transmitted to Mobile test transceiver 45. Both first RSSI receiver 140 and second RSSI receiver 145 may be programmed with a series of frequencies to be scanned and measured sequentially. The scan list may reasonably hold up to 20 frequencies in each receiver for any given test.

Figure 3:
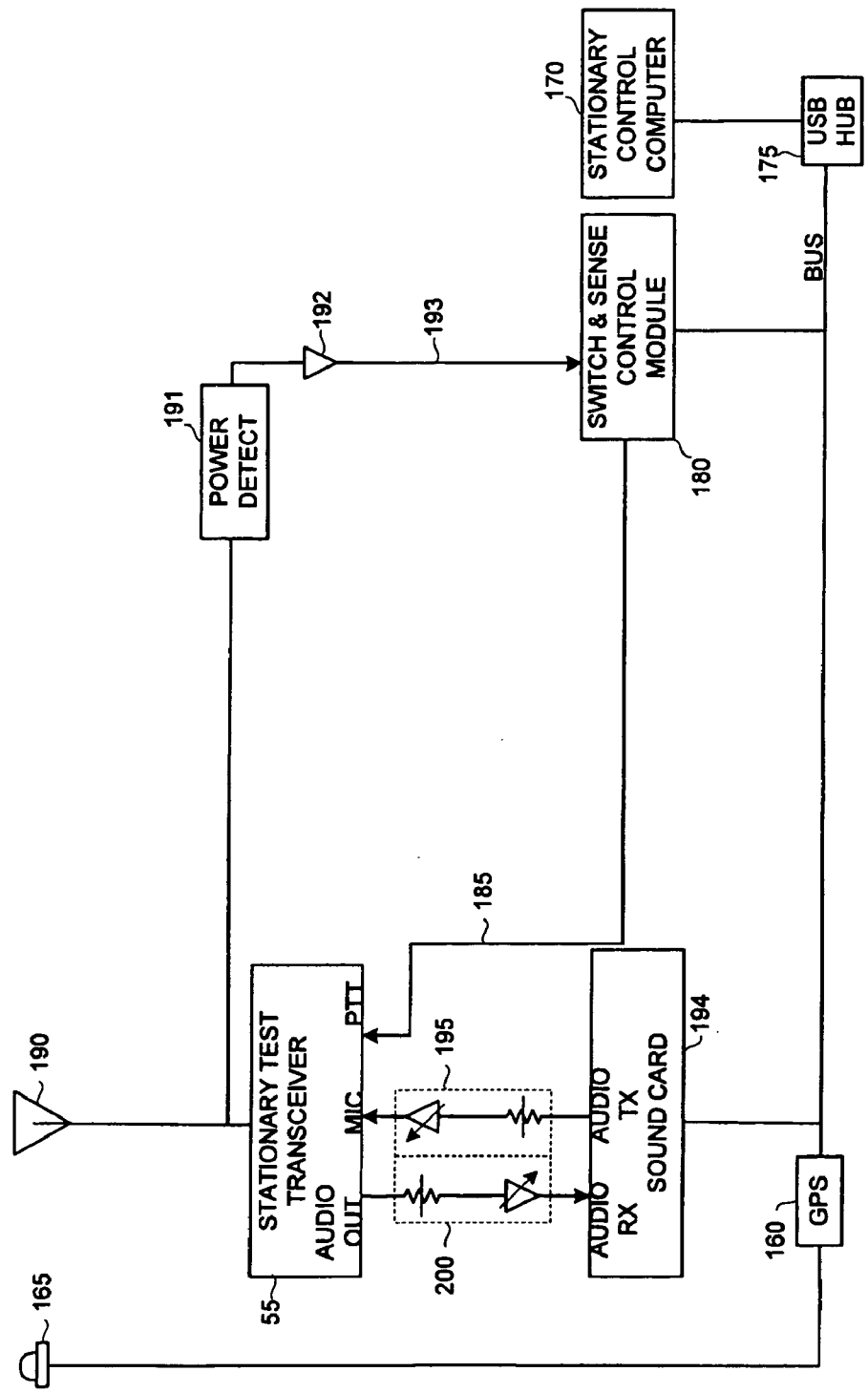
FIG. 3 presents in schematic diagram form the Fixed Apparatus of the invention.

FIG. 3 depicts in schematic form the elements of Fixed Apparatus 10. Second GPS Receiver Subsystem 160 receives signals from the GPS satellite system via second GPS Antenna 165 and provides time data to Stationary control computer 170. The GPS time is used to synchronize the time clock on Stationary control computer 170 at the beginning of a test on each day. GPS location of the Fixed Apparatus is also stored for test documentation. Stationary control computer 170 is typically a laptop PC with the same specifications as Mobile control computer 30. The PTT sequence is controlled by Stationary control computer 170 via second USB hub 175, second Switch and Sense Control Module 180, and second PTT Control Line 185 to Stationary test transceiver 110. The sequence of operation is the same as that of the Mobile Apparatus 5. Stationary test transceiver 110 is a mobile radio compatible with Radio System 15. Stationary test transceiver 110 transmits and receives radio frequency (RF) signals via Stationary Transceiver Antenna 190. Unlike Mobile Apparatus 5, Fixed Apparatus 10 does not have a programmable attenuator in series with the antenna. The process for sending a channel grant request and transmitting a test message is the same for Fixed Apparatus 10 as it is for Mobile Apparatus 5. Upon receiving a PTT control signal from Stationary control computer 170 via second USB hub 175, second Switch and Sense Control Module 180 and second PTT Control Line 185, Stationary test transceiver 110 requests a channel grant from Radio System 15. Stationary control computer 170 monitors RF power via second Power Detect Circuit 191, second Power Detect Preamplifier 192, second Power Detect Line 193, second Switch and Sense Control Module 180 and second USB hub 175. After Stationary test transceiver 110 has been transmitting for a predetermined period of time, Stationary control computer 170 sends an audio test message via second Sound Card 194 and Stationary test transceiver 110 to Radio System 15. Second Sound Card 194, second Transmit Audio Level Control 195 and second Receive Audio Level Control 200 send and receive test messages between Stationary test transceiver 110 and Stationary control computer 170. They serve the same functions as first sound card 105, first Transmit Audio Level Control 115 and first Receive Audio Level Control 120 in Mobile Apparatus 5.

Figure 3A:
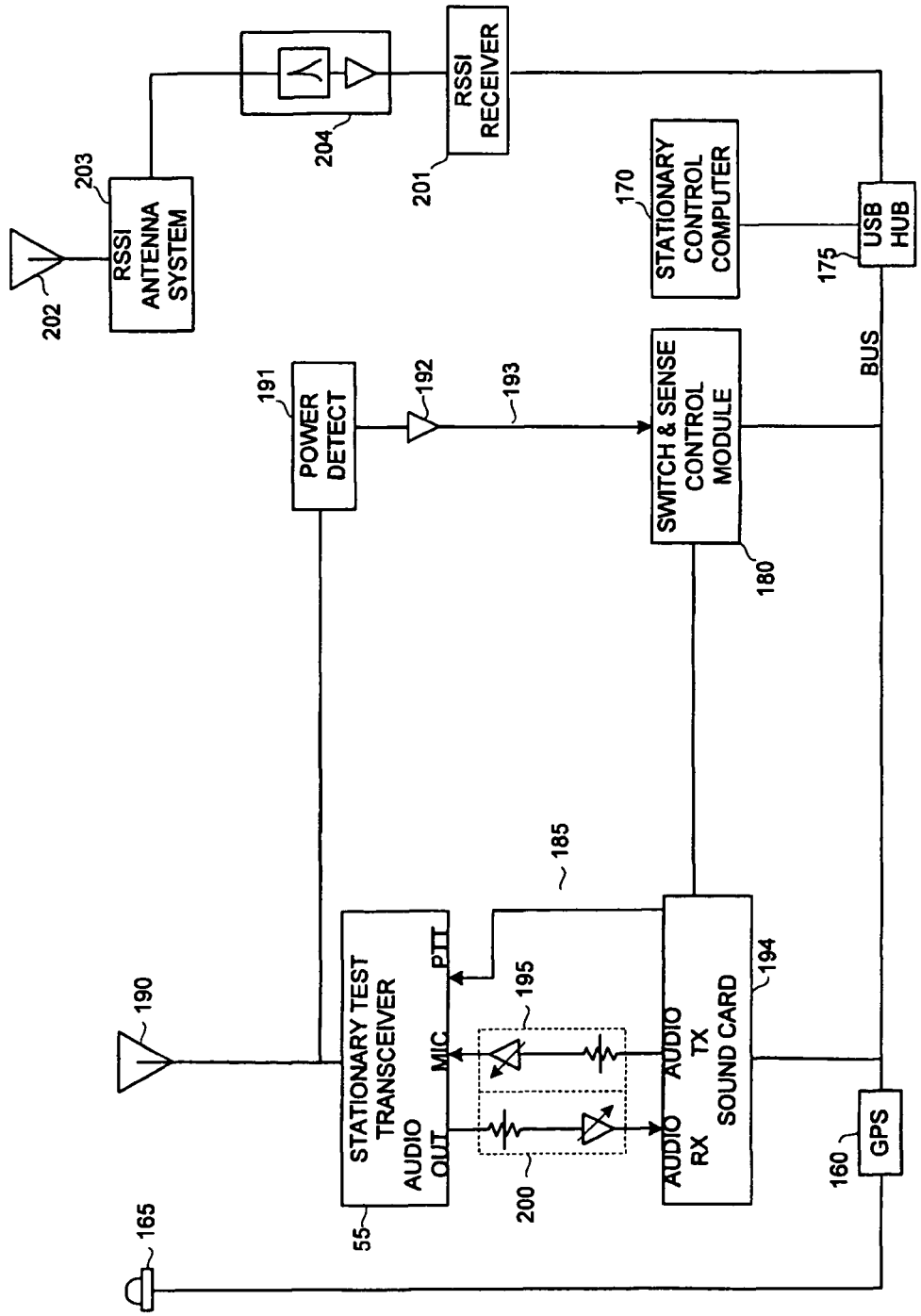
FIG. 3A presents in schematic diagram form an alternative embodiment of the Fixed Apparatus of this invention.

FIG. 3A presents in schematic diagram form an alternative embodiment of the Fixed Apparatus of the invention. It may be desirable to measure the signal strength at the fixed location. Reasons for doing so include verifying that the signal is strong, recording its value as part of the test documentation, determining whether signal strength is varying over time or differs from one channel to another. In such cases, optional RSSI receiver 201 is connected to optional RSSI antenna 202 through optional RSSI Antenna System 203 and optional RSSI Receiver Filter and Preamplifier Stage 204. The balance of FIG. 3A replicates the schematic diagram of FIG. 3.

Figure 4:
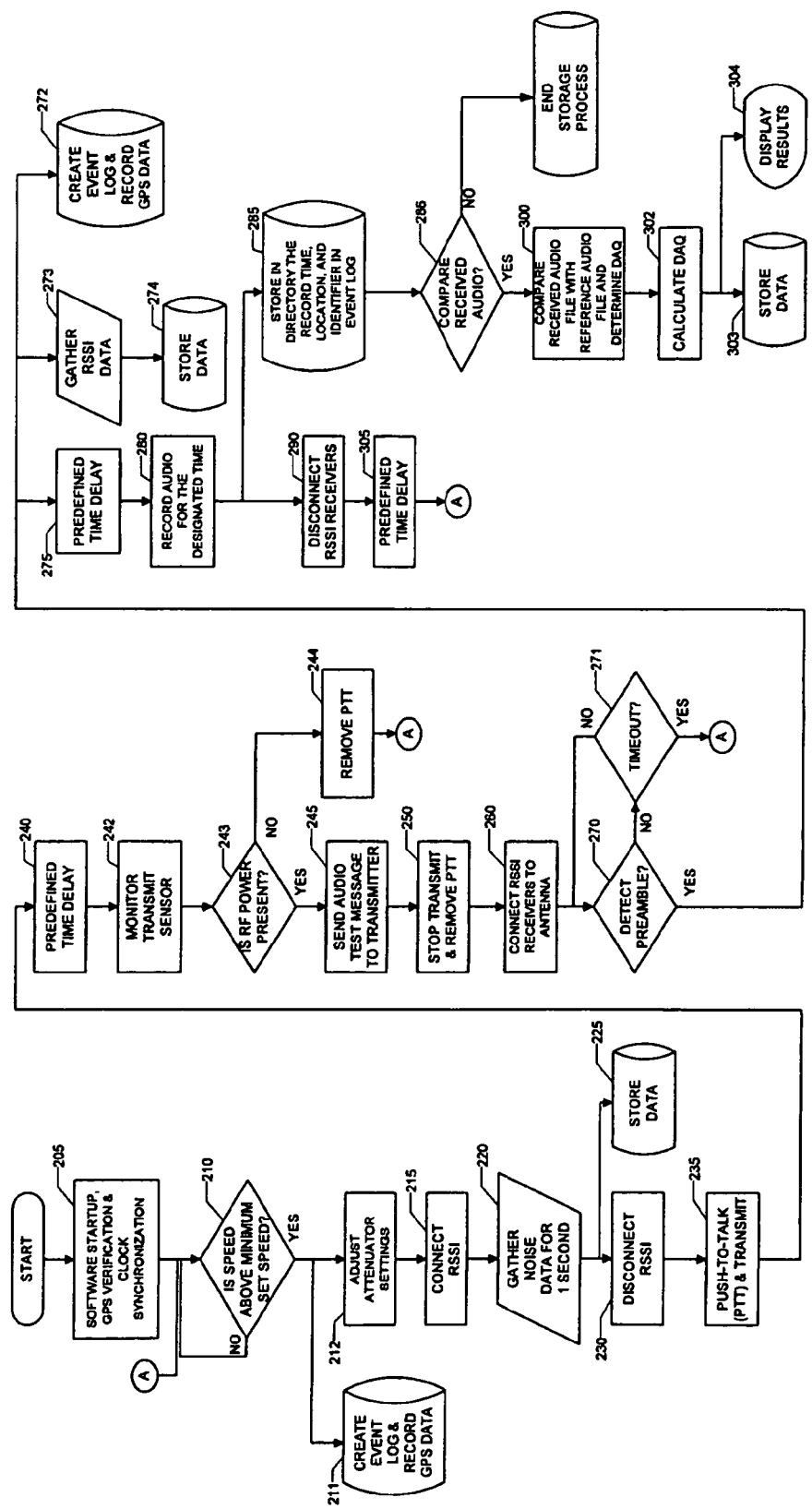
FIG. 4 illustrates the software method of the invention in block diagram form within the Mobile Apparatus when continuous testing is selected.
Figure 5:
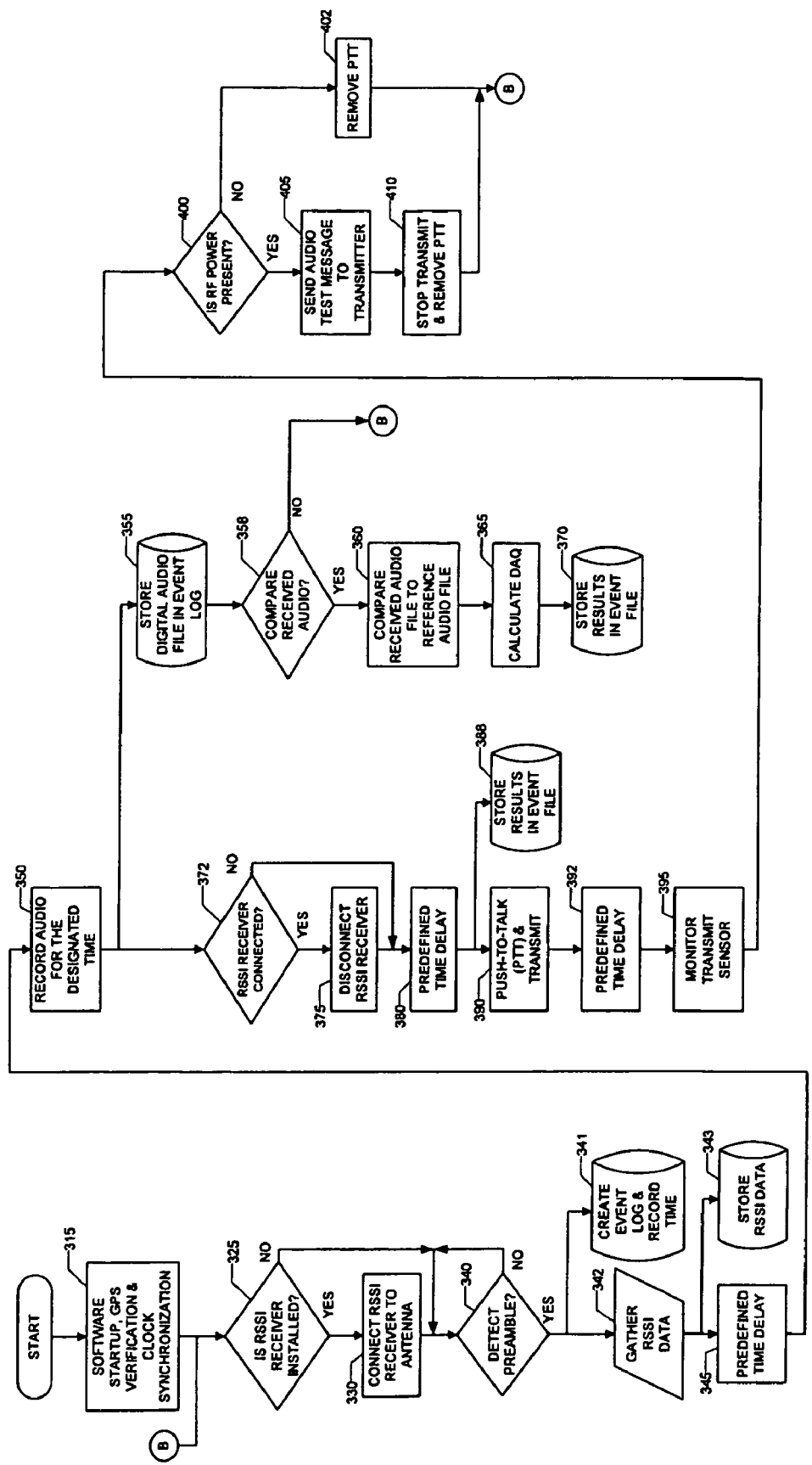
FIG. 5 illustrates the software method of the invention in block diagram form within the Fixed Apparatus when continuous testing is selected.

As already indicated, the subject invention is used to measure the geographic coverage provided by a two-way Radio System 15. Depending on the specific objective of the testing to be undertaken, the test facility may be employed pursuant to three basic modes: continuous, grid and mobile receive-only. Thus, an initial decision is required as to which mode to employ. FIG. 4 and FIG. 5 illustrate the software method of the invention in block diagram form when continuous testing is selected. The process employed within Mobile Apparatus 5 during this type of testing is shown in FIG. 4, while the process employed within Fixed Apparatus 10 is shown in FIG. 5. In this test mode, the radio coverage area is not gridded and testing proceeds entirely on a timed basis. For example, a test sequence may be initiated once every minute. All such tests are two-way tests in that a call from the mobile to the fixed apparatus is made, measured and followed by a call in the reverse direction, from the fixed to the mobile apparatus. This mode of testing is suitable where it is desired to collect the maximum amount of data possible, especially in situations where collection of data in a concentrated area for diagnostic purposes is sought. Furthermore, some radio system vendors prefer this mode of testing for measuring coverage along a planned drive route. Note, however, that this mode may also be used to collect data over a widely dispersed area. In this mode, both Mobile Apparatus 5 and Fixed Apparatus 10 require software startup, software initialization and GPS synchronization as shown at 205 in FIG. 4 and at 315 in FIG. 5 before the test sequence can begin. GPS synchronization involves verifying the correct GPS status as defined by the operator and synchronizing the system clock at Mobile Control Computer 30 in FIG. 2, and at Stationary Control Computer 170 in FIG. 3, to the respective GPS time as determined at 20 in FIG. 2 and at 160 in FIG. 3. As part of software initialization in each test mode, another decision is made setting the minimum DAQ score (as explained below) which should be considered as "passing". This threshold will change from radio system to radio system and may be set by the test operator or the owner of the radio system. Once the software in both Mobile Apparatus 5 and Fixed Apparatus 10 has been initialized, the test sequence can begin.

FIG. 4 illustrates the process at Mobile Apparatus 5 when continuous testing is selected. The speed threshold of the test vehicle is checked at 210 using speed data from first GPS receiver subsystem 20. The operator sets this threshold during software initialization. The test sequence waits until the vehicle exceeds the speed threshold.

When the vehicle exceeds the speed threshold, the Mobile control computer 30 creates an event log and records GPS time, location (longitude and latitude), and vehicle speed in the event file at 211. The GPS location (longitude and latitude) is used to determine the proper settings for Programmable attenuator 55, and the appropriate adjustments are made at 212. First RSSI receiver 140 and second RSSI receiver 145 are connected at 215 to their antenna 135 through RSSI antenna system 130. The RSSI receivers are tuned to preprogrammed frequencies and gather noise data for one second at 220. The noise data from first RSSI Receiver 140 and second RSSI receiver 145 are stored at 225 in Mobile Control Computer 30 as noise levels. First RSSI Receiver 140 and Second RSSI receiver 145 are then disconnected at 230 by disengaging the RF relay in RSSI Antenna System 130.

A PTT signal is initiated at 235 to place Mobile test transceiver 45 in transmit mode. The test sequence waits until a preprogrammed transmit detect time has expired at 240. (This preprogrammed transmit time is set up during software initialization.) Power Detect Circuit 90 is then monitored to detect transmitting RF power at 242. If RF power is present at 243, then this is an indication that trunked Radio System 15 has assigned a channel or talk-path to Mobile test transceiver 45. If RF power is not present, the system removes PTT signal at 244, and the test sequence returns to A.

Once the channel grant is received (by having transmit power detected at 242), an audio test message is then queued up and transmitted at 245 to Fixed Apparatus 10 via Radio System 15. The audio test message is a sequence of sounds and silence including a preamble (generally 0.5 seconds in length), a silent period (which must be at least as long as the preamble), and then an audio message (pre-recorded human speech, generally 4-10 seconds in length). The preamble is either a burst of noise (compatible with the digital vocoder in Mobile test transceiver 45 and Stationary test transceiver 110) or a series of tones (generally used for Radio Systems employing analog modulation). When the preamble is detected on Fixed Apparatus 10, it knows that there is an incoming message from Mobile Apparatus 5. The length of the preamble (in milliseconds) is pre-programmed into the Fixed Apparatus 10 as a delay before recording the audio message. The silent period is a buffer between the preamble, which should not be recorded or processed, and the audio message, which is subsequently analyzed for audio quality. Fixed Apparatus 10 is pre-programmed with the length of the audio test message (in seconds), which in turn is used to determine when to stop recording. When the audio test message is complete (as measured by elapsed time), removing the PTT signal from Mobile test transceiver 45 stops the RF transmission at 250. Now Mobile Apparatus 5 can begin monitoring for the same audio test message preamble to be sent from Fixed Apparatus 10.

When the RF transmission ends at 250, first RSSI Receiver 140 and second RSSI receiver 145 are connected at 260 to RSSI antenna 135. The audio output of Mobile test transceiver 45 is monitored for the appropriate preamble at 270. If the preamble is not detected before a specified time delay in 271, the test call times out and returns to the beginning of the test sequence A.

Once the preamble is detected, Mobile control computer 30 creates an event log and records GPS time, location (longitude and latitude), and vehicle speed in the event file at 272. First RSSI receiver 140 and second RSSI receiver 145 gather RF signal strength data at 273 (the RSSI receivers are pre-tuned to selected frequencies during software initialization) and store the data in the event file at 274. When the audio test message preamble is detected at 270, a predefined delay (corresponding to the length of the preamble) is initiated at 275. When the predefined delay is completed, the Mobile Apparatus begins recording to capture the audio portion of the message. When the pre-programmed record time has been reached at 280, the received audio record is stored in a designated directory with the time, location and a unique identifier at 285.

An election whether to compare the received audio file with the stored reference audio file is made during software initialization. If this option is selected at 286 (to perform the calculation "real time" as opposed to obtaining the data during post-processing), the received digital audio file is compared to a stored reference audio file at 300 using the Perceptual Evaluation of Speech Quality (PESQ algorithm as defined by ITU-T standard P.862). The received audio file is compared to a pre-recorded copy (or Master) of the audio file to determine the degradation of the original message due to the effects of Radio System signal processing and environmental effects along the wireless path, including free-space loss, multipath fading and interference from external sources. The result of this comparison is subjected to an empirical set of weighting factors in order to be converted into a score for DAQ at 302. The first step in the conversion process is to determine whether there is any audio present, or whether a recording of dead air has occurred. This is done by considering that the audio levels during the test message vary from a normalized amplitude level of −1 to +1. While the average audio level may be zero, it is clear that the square root of the amplitude squared will in general be a non-zero value. The digitally recorded message file contains approximately 40,000 samples per second. The average root mean square amplitude of the sampled message file corresponding to a test location is calculated. If the average root mean square amplitude for the test location exceeds 0.02, calculation of DAQ may proceed. If the average root mean square amplitude is less than 0.02, an assumption is made that the file is blank and a DAQ of 0.0 is assigned to the test location. This corresponds to "no voice detected" during the audio message. This test point fails, but is not generally categorized as "untested". Once a determination is made that audio is present, the second step is to convert the PESQ scoring to DAQ. The PESQ algorithm produces a number of outputs that measure the correlation between the received audio file and the reference file. The "Combined PESQ" value is used in the conversion to DAQ. The conversion is accomplished via look-up tables stored in Mobile control computer 30 by reference to which Combined PESQ values are converted to a DAQ score. A pair of such tables are presented in FIG. 10. The first, longer lookup table is used to convert the "PESQ Combined" score to DAQ after the PESQ algorithm has completed the comparison of the received audio file with the reference audio file. The second table is used to finalize the DAQ score based on the "Number of Dropouts" obtained from the PESQ results. Dropouts are spots (data points) on the recorded file where there ought to be some audio (by comparison to the master file), but the audio is missing or blank. The missing audio instance may be a single sample (a few microseconds) or it may last thousands of samples (up to 1 or more seconds in length). But each instance is counted only once. The PESQ routine then totals the number of dropouts in the recorded file and records this as an integer value with the other parameters for the test location. This is a corrective measure used to overcome anomalies in the PESQ algorithm since the PESQ results can show a high "PESQ Combined" score even when there are a large number of dropouts. To correct this problem, a multiplier is used to adjust the DAQ score based on the number of dropouts obtained from the PESQ results. The parameters in the look-up tables were developed from empirical testing using the PESQ algorithm and statistically averaged DAQ scores determined by professional communicators (public safety radio dispatchers from E 9-1-1 Centers). The calibration was conducted as follows: A reference file was created by an individual recording a series of Harvard "standard phrases". This reference file was then used in a coverage test so that actual conditions would be replicated in the recorded audio files. The received audio files were subsequently played back for people who are familiar with the audio quality typical of land mobile radio systems, and who are also familiar with the understandability scoring method for DAQ. Their scores were then tabulated for the test calls.

The received audio test files were also subjected to analysis by the PESQ algorithm, which produced a series of values for each test call. The statistically averaged human-scored values for DAQ were compared to the PESQ parameters. It was determined that the "Combined PESQ" parameter had the highest correlation to the human scores for DAQ. The fit between the PESQ and DAQ scores was determined by a least-squares method with a polynomial curve. The look-up table was created from this polynomial. The values in the look-up table are refined over time by expanding the database of people who have listened to and scored the test calls in a process termed "verification". It is also possible to change the reference audio file, for example, to reflect a better fit between PESQ and DAQ. Other parameters reported by the PESQ algorithm may also be employed including "utterances".

The location tested (recorded at 272) and the results of the test are stored in the event log at 303 and marked on a computer-generated map displayed at 304 on the monitor of Mobile control computer 30 with either a pass or fail designation. First RSSI receiver 140 and second RSSI receiver 145 are then disconnected at 290 from RSSI antenna 135 after the audio is recorded at 280. The test sequence is then placed in a wait state for a predetermined (set during software initialization) period of time at 305. This delay gives Mobile test transceiver 45 and Stationary test transceiver 110 a period for cool down. When the inter-test period has expired, the test sequence is restarted at A.

FIG. 5 illustrates the process at Fixed Apparatus 10 when continuous testing is selected. After Fixed Apparatus 10 software is started, initialized and Stationary Control Computer 170 clock is synchronized at 315 with the GPS time, the test sequence is ready to begin. At 325, if optional RSSI Receiver 201 is installed in Fixed Apparatus 10, optional RSSI Receiver 201 is connected at 330 to optional RSSI Antenna 202 through optional RSSI Antenna System 203 and optional RSSI Receiver Filter and Preamplifier Stage 204. Fixed Apparatus 10 begins monitoring at 340 for the audio test preamble to be sent from Mobile Apparatus 5 via Radio System 15. Once the preamble is detected, Stationary control computer 170 creates an event log and records the time at 341. If the optional RSSI Receiver 201 is part of the Fixed Apparatus 10, the optional RSSI Receiver 201 gathers RF signal strength data at 342 (the RSSI Receiver is pre-tuned to a selected frequency or frequencies during software initialization) and stores the data in the event file at 343 on Stationary control computer 170.

When the preamble is detected on Fixed Apparatus 10, a predefined delay (corresponding to the length of the preamble) is initiated at 345. When the predefined delay is completed, the Fixed Apparatus begins recording to capture the audio portion of the message. When the pre-programmed record time has been reached at 350, the received audio record is stored in a designated directory with a unique file name in the event log at 355. The time that the message was received (recorded at 341) is also stored with the file in the event log, and is later used to correlate with the time recorded in the Mobile Apparatus 5. In this way, we can determine the location from which Mobile Apparatus 5 made the test call.

An election whether to compare the received audio file with the stored reference audio file is made during software initialization. If this option is selected at 358 (to perform the calculation "real time" as opposed to obtaining the data during post-processing), the audio is compared at 360, then a score for DAQ is determined at 365 and the results are stored at 370 in the event log on Stationary control computer 170. The calculation for DAQ at the Fixed Apparatus 10 is analogous to the procedure described above for Mobile Apparatus 5 in FIG. 4 (see steps 300 through 304) with the exception that no visual display is made in real-time on Stationary control computer 170. At 372, if optional RSSI Receiver 201 is provisioned with Fixed Apparatus 10, then optional RSSI Antenna System 203 disconnects optional RSSI Antenna 202 from optional RSSI Receiver 201 at 375. The test sequence is then placed in a wait state at 380 for a predetermined period of time (set during software initialization).

When the inter-test period has expired at 380, Stationary control computer 170 creates an event log and records the time in the event file at 388. A PTT sequence is initiated at 390 to place Stationary test transceiver 110 in transmit mode. The test sequence waits until a preprogrammed transmit detect time has expired at 392. (This preprogrammed transmit time is set up during software initialization.) Second Power Detect Circuit 191 is monitored to detect transmitting RF power at 395. If RF power is present at 400, then this is an indication that trunked Radio System 15 has assigned a channel or talk-path to Stationary test transceiver 110. If RF power is not present, the system removes PTT signal at 402 and the test sequence returns to B.

Once the channel grant is received (by having transmit power detected at 400), an audio test message is then queued up and transmitted at 405 to Mobile Apparatus 5 via Radio System 15. When the audio test message is complete (as measured by elapsed time), the PTT signal is removed from Stationary test transceiver 110 and the RF transmission is stopped at 410. Fixed Apparatus 10 now starts a new test sequence at B and begins monitoring for an audio test preamble to be sent from Mobile Apparatus 5.

Figure 6:
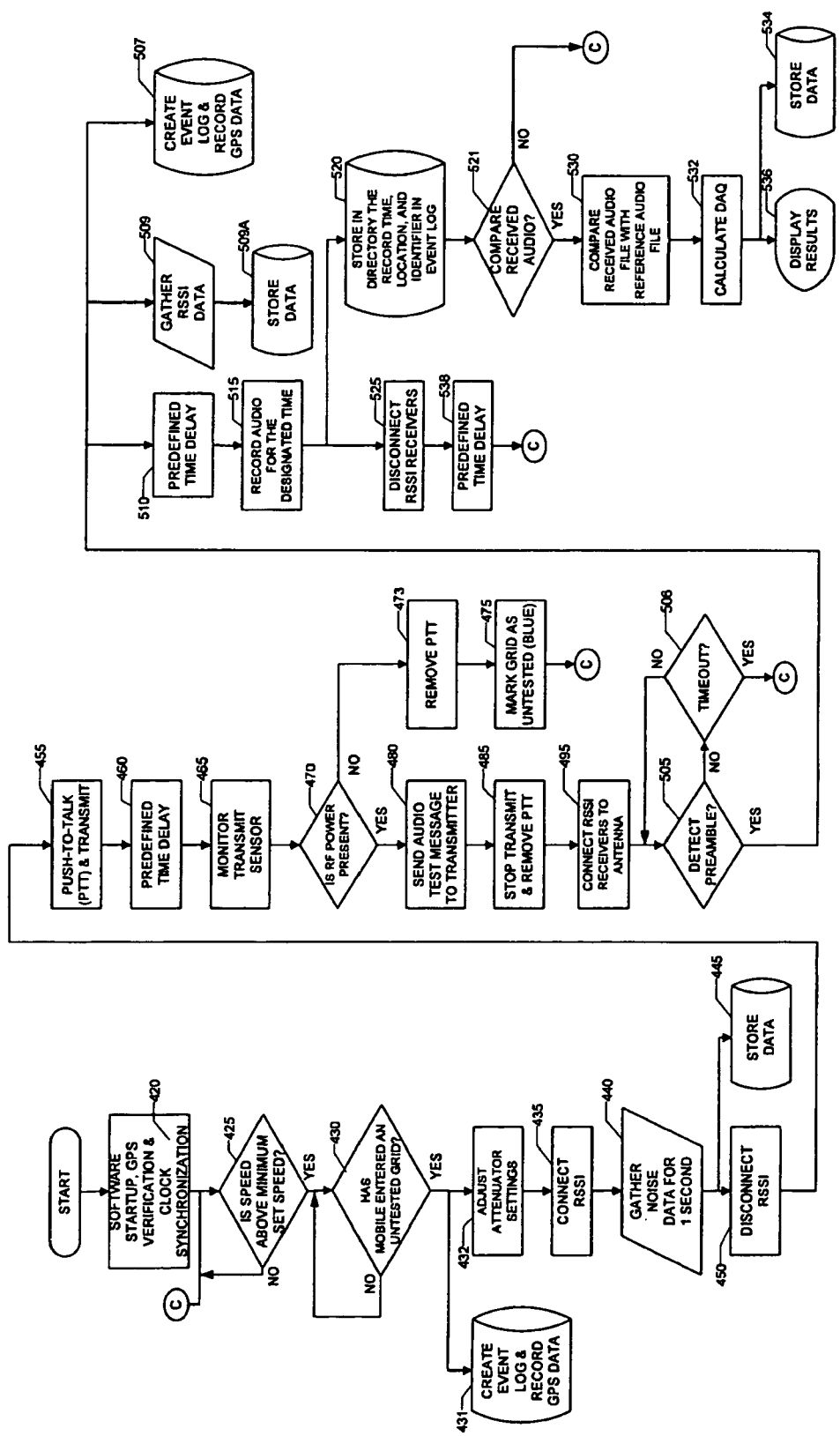
FIG. 6 illustrates the software method of the invention in block diagram form within the Mobile Apparatus when grid testing is selected.
Figure 7:
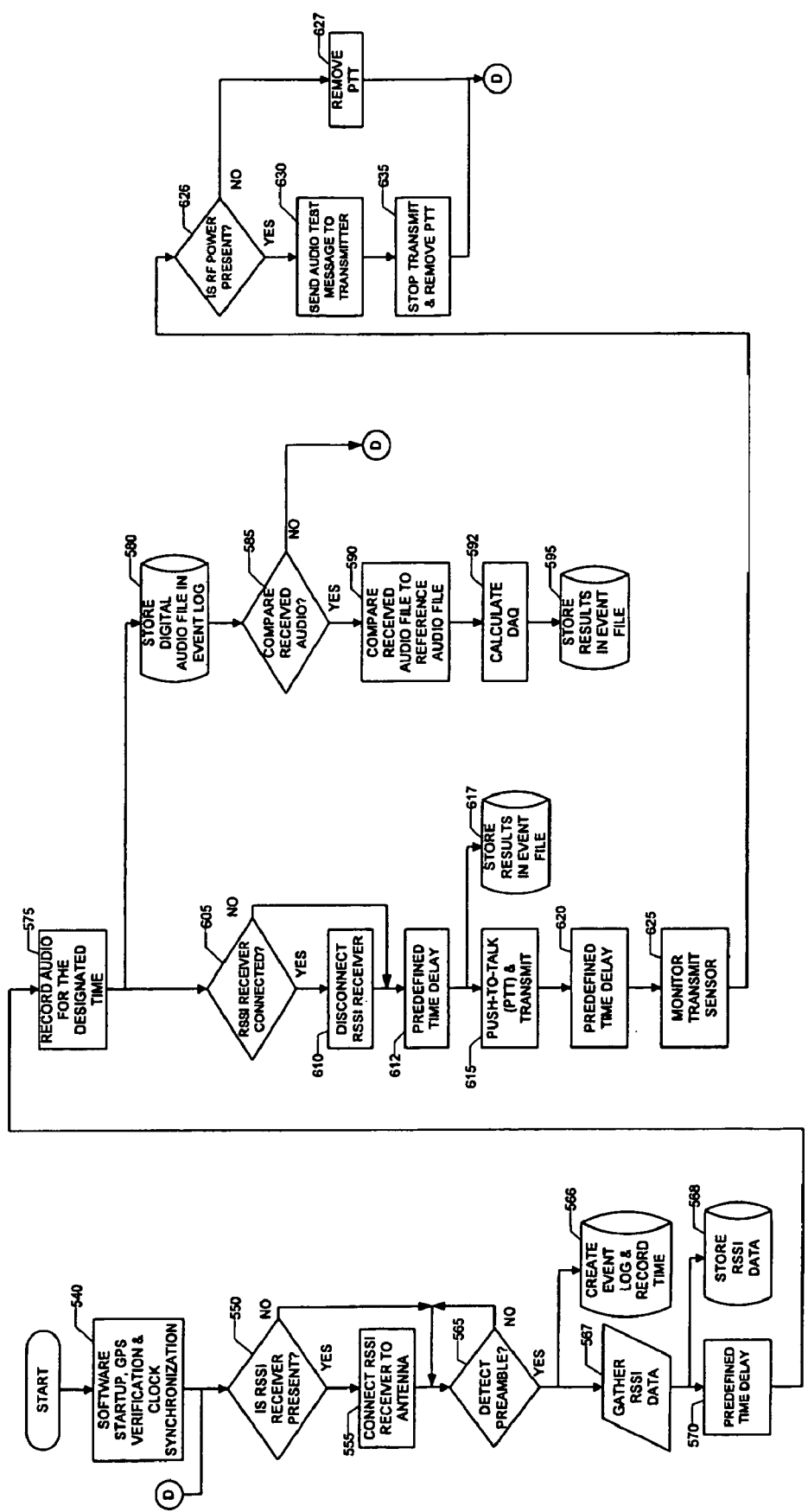
FIG. 7 illustrates the software method of the invention in block diagram form within the Fixed Apparatus when grid testing is selected.

FIG. 6 and FIG. 7 illustrate the software method of the invention in block diagram form when grid testing is selected. In this mode, a predesignated radio service area is divided into rectangular grids (or cells). Each grid has geographic coordinates and is indexed in a database prior to testing. Establishment of a grid is a collaborative effort between the party whose system is being tested (the "Owner") and the operator using the invention disclosed herein (the "Tester"). The Owner provides the Tester with a definition of the Service Area to be tested which could be, for example, the geographic area enclosed by the legal boundaries of a county. The Owner also provides a map or narrative description showing the test Zones and unique conditions applicable in each test Zone, e.g., portable on a street, portable in a light building, portable in a medium building, etc. The Owner specifies whether the portable device is hand-held at head level, clipped to a belt, or supplied with a public safety speaker/microphone with shoulder-mounted antenna. The corresponding attenuation factor for each test Zone is calculated by the Tester and presented to the Owner for approval. Once the test Zones and attenuation factors are set, the Tester lays out the grid for each test Zone. The grid structure itself is rectangular with the top and bottom lines being aligned along an east-west orientation (i.e., along lines of equal latitude), while the side lines are aligned along a north-south orientation (i.e., along lines of equal longitude). Individual cells within the structure are thus defined by the longitude and latitude of the four corners. All cells are of equal size. Coordinates provided by first GPS receiver subsystem 20 can be used to locate the position of Mobile Apparatus 5 when the test sequence is begun. Cells that lie outside the Owner's Service Area are disabled. The number of cells within each test Zone is determined by the Tester. The criteria set forth in TIA/EIA Telecommunications Systems Bulletin TSB88-B {1} may be used as a guide in setting the cell size which, in turn, determines the number of cells enclosed in the test Zone. By examining the publicly accessible roads in the test Zone, the Tester can estimate the number of cells that will reasonably be included in the test sample. TSB88-B defines the minimum number of cells required for the test sample to be statistically valid for the test Zone. There are, of course, some practical limits in sizing the cells. If the cell is too small, it will be difficult to collect the data while in a moving vehicle; if the cell is too large, the data collected may not be representative of the area contained within the cell. All of these factors are included in the determination of final grid structure. The Tester provides the recommended grid structure for each test Zone to the Owner for approval prior to commencing the coverage test.

In the preferred embodiment, one and only one test in each direction (mobile-to-fixed apparatus and fixed-to-mobile apparatus) is then conducted in each grid (cell). Since there are only three results that can be obtained for any cell within a grid (pass, fail or not tested), an alternative approach would be to conduct multiple measurements within a grid (cell) and then take the mean or median outcome as the result for each cell. This approach would be preferable in a situation where the size of the grid cannot be reduced enough to create a statistically significant quantity of cells. Multiple tests within each grid would then increase the total number of tests over the service area resulting in a test that is statistically valid. Practical considerations may limit the number of grids for which a test may be conducted due, for example, to inaccessibility by vehicular traffic. This mode of testing is appropriate where the objective is to determine how many grids will achieve a passing or acceptable DAQ score. What DAQ score is considered passing or acceptable is a subjective decision to be made by the Owner of the equipment being tested. By counting the number of passing grids and dividing by the total number of grids for which a measurement was obtained, an overall percentage passing grade may be calculated for the radio system under test within the chosen service area. A geographic representation of test results is also useful to indicate where there are coverage gaps and/or poor radio system performance. While this method does show areas with deficient coverage, it is not well-suited for fault isolation. Thus, after grid testing has revealed problematic grids, it may be useful to employ continuous testing (as explained above) as a diagnostic technique within such grids.

In the grid testing mode, both Mobile Apparatus 5 and Fixed Apparatus 10 require software startup, software initialization and GPS synchronization as shown at 420 in FIG. 6 and at 540 in FIG. 7 before the test sequence can begin. The GPS synchronization involves verifying the correct GPS status as defined by the operator and synchronizing the system clock at Mobile control computer 30 in FIG. 2 and at Stationary control computer 170 in FIG. 3 to the respective GPS time as determined at 20 in FIG. 2 and at 160 in FIG. 3. Once the software in both Mobile Apparatus 5 and Fixed Apparatus 10 has been initialized, the test sequence can begin.

FIG. 6 illustrates the process at Mobile Apparatus 5 when grid testing is selected. The speed threshold of the test vehicle is checked at 425 using speed data from first GPS receiver subsystem 20. The operator sets this threshold during software initialization. The test sequence waits until the vehicle exceeds the speed threshold. When the vehicle exceeds the speed threshold, the position of the vehicle (determined by first GPS receiver subsystem 20) is compared at 430 with the coordinates of the map grid displayed on Mobile control computer 30. If the test vehicle has entered an untested grid, then Mobile control computer 30 creates an event log and records GPS time, location (longitude and latitude), grid index number, and vehicle speed in the event file at 431. The GPS location (longitude and latitude) or grid index number is used to determine the proper settings for Programmable attenuator 55, and the appropriate adjustments are made at 432. Mobile control computer 30 marks the grid index number as "tested" so that subsequent queries will indicate that the grid has been visited and tested. (If the operator wants to allow multiple tests within a grid, this feature in the software can be disabled.)

First RSSI Receiver 140 and second RSSI receiver 145 are connected at 435 to Antenna 135 through RSSI Antenna System 130. The RSSI receivers are tuned to preprogrammed frequencies and gather noise data for one second at 440. The noise data from first RSSI Receiver 140 and second RSSI receiver 145 are stored at 445 in Mobile control computer 30 as noise levels. First RSSI Receiver 140 and second RSSI Receiver 145 are then disconnected at 450 by disengaging the RF relay in RSSI Antenna System 130. A PTT signal is initiated at 455 to place Mobile test transceiver 45 in transmit mode. The test sequence waits until a preprogrammed transmit detect time has expired at 460. (This preprogrammed transmit time is set up during software initialization.) First power detect circuit 90 is then monitored to detect transmitting RF power at 465. If RF power is present at 470, then this is an indication that trunked Radio System 15 has assigned a channel or talk-path to Mobile test transceiver 45. If RF power is not present, the PTT signal is removed at 473, the grid is marked as "untested" at 475 and the test sequence returns to C. (Grids visited, but not tested may be distinguished from grids not visited by assigning a color or shading on the map display in Mobile control computer 30.)

Once the channel grant is received (by having transmit power detected for the specified period of time at 470), an audio test message is then queued up and transmitted at 480 to Fixed Apparatus 10 via Radio System 15. When the audio test message is complete (as measured by elapsed time), removing the PTT signal from the Mobile test transceiver 45 stops the RF transmission at 485. Now Mobile Apparatus 5 can begin monitoring for the same audio test message to be sent from Fixed Apparatus 10. When the RF transmission ends at 485, first RSSI Receiver 140 and second RSSI receiver 145 are connected to RSSI Antenna 135 at 495. The audio output of the Mobile test transceiver 45 is monitored for the appropriate preamble at 505. If the preamble is not detected before a specified time delay in 506, the test call times out and returns to the beginning of the test sequence C. Once the preamble is detected, Mobile control computer 30 creates an event log and records GPS time, location (longitude and latitude), grid index number, and vehicle speed in the event file at 507. First RSSI receiver 140 and second RSSI receiver 145 gather RF signal strength data at 509 (the RSSI receivers are pre-tuned to selected frequencies during software initialization) and store the data in the event file at 509A. When the audio test message preamble is detected at 505, a predefined delay (corresponding to the length of the preamble) is initiated at 510. When the predefined delay is completed, the Mobile Apparatus 5 begins recording to capture the audio portion of the message. When the pre-programmed record time has been reached at 515, the received audio record is stored in a designated directory with the time, location and a unique identifier at 520.

An election whether to compare the received audio file with the stored reference audio file is made during software initialization. If this option is selected at 521 (to perform the calculation "real time" as opposed to obtaining the data during post-processing), the received digital audio file is compared to a stored reference audio file at 530 using the Perceptual Evaluation of Speech Quality (PESQ algorithm as defined by ITU-T standard P.862). The result of this comparison is subjected to an empirical set of weighting factors, as described above, in order to be converted into a score for DAQ at 532. During the calculation of DAQ, a check is also performed for missing or blank audio in the recorded audio files, and such omissions are filtered out of the records so that they are not subjected to further processing. The location tested (recorded at 507) and the results of the test are stored in the event log at 534. The grid tested is marked on a computer-generated grid map displayed on Mobile control computer 30 at 536 with either a pass or fail designation. This designation may be a color, such as green for passed and red for failed, or any other distinguishing visible indicia, such as, but not limited to, hatching, shading or inverse display or aural indicia, such as, but not limited to, differing tones or a sequence of tones. First RSSI Receiver 140 and second RSSI receiver 145 are disconnected at 525 from RSSI Antenna 135 after the audio is recorded at 515. The test sequence is then placed in a wait state for a predetermined (set during software initialization) period of time at 538. This delay gives Mobile test transceiver 45 and Stationary test transceiver 110 a period for cool down. When the inter-test period has expired, the test sequence is restarted at C.

FIG. 7 illustrates the process at Fixed Apparatus 10 when grid testing is selected. After Fixed Apparatus 10 software is started, initialized and the Stationary control computer 170 clock is synchronized at 540 with the GPS time, the test sequence is ready to begin. At 550, if optional RSSI Receiver 201 is connected to Fixed Apparatus 10, optional RSSI Receiver 201 is connected at 555 to optional RSSI Antenna 202 through optional RSSI Antenna System 203 and optional RSSI Receiver Filter and Preamplifier Stage 204. Fixed Apparatus 10 begins monitoring at 565 for the audio test preamble to be sent from Mobile Apparatus 5 via Radio System 15. Once the preamble is detected, Stationary control computer 170 creates an event log and records the time at 566. If optional RSSI Receiver 201 is part of Fixed Apparatus 10, optional RSSI Receiver 201 gathers RF signal strength data at 567 (the optional RSSI Receiver 201 is pre-tuned to a selected frequency or set of frequencies during software initialization) and stores the data in the event file at 568 on Stationary control computer 170. When the preamble is detected on Fixed Apparatus 10, a predefined delay (corresponding to the length of the preamble) is initiated at 570. When the predefined delay is completed, the Fixed Apparatus 10 begins recording to capture the audio portion of the message. When the pre-programmed record time has been reached at 575, the received audio record is stored in a designated directory with a unique file name in the event log at 580. The time that the message was received (recorded at 566) is also stored with the file in the event log, and is later used to correlate with the time recorded in the Mobile Apparatus 5. In this way, we can determine the location from which Mobile Apparatus 5 made the test call. An election whether to compare the received audio file with the stored reference audio file at 590 is made during software initialization. If this option is selected at 585 (to perform the calculation "real time" as opposed to obtaining the data during post-processing), the audio is compared at 590, then a score for DAQ is determined at 592 and the results are stored at 595 in the event log on Stationary control computer 170. The calculation for DAQ at Fixed Apparatus 10 is analogous to the procedure described above for Mobile Apparatus 5 in FIG. 6 (see steps 530 through 536) with the exception that no visual display is made in real-time on the Stationary control computer 170.

At 605, if optional RSSI Receiver 201 is provisioned with Fixed Apparatus 10, then optional RSSI Antenna System 203 disconnects optional RSSI Antenna 202 from optional RSSI Receiver 201 at 610. The test sequence is then placed in a wait state at 600 for a predetermined period of time (set during software initialization). When the inter-test time period has expired at 612, Stationary control computer 170 creates an event log and records the time in the event file at 617. A PTT sequence is initiated at 615 to place Stationary test transceiver 110 in transmit mode. The test sequence waits until a preprogrammed transmit detect time has expired at 620. (This preprogrammed transmit time is set up during software initialization.) Power Detect Circuit 165 is monitored to detect the transmission of RF power at 625. If RF power is present at 626, then this is an indication that trunked Radio System 15 has assigned a channel or talk-path to Stationary test transceiver 110. If RF power is not present for the specified period of time, the system removes PTT signal at 627 and the test sequence returns to D.

Once the channel grant is received (by having transmit power detected for the specified period of time at 625), an audio test message is then queued up and transmitted at 630 to Mobile Apparatus 5 via Radio System 15. When the audio test message is complete (as measured by elapsed time), the PTT signal is removed from Stationary test transceiver 110 and the RF transmission is stopped at 635. Fixed Apparatus 10 starts a new test sequence at D and begins monitoring for an audio test preamble to be sent from Mobile Apparatus 5.

Figure 8:
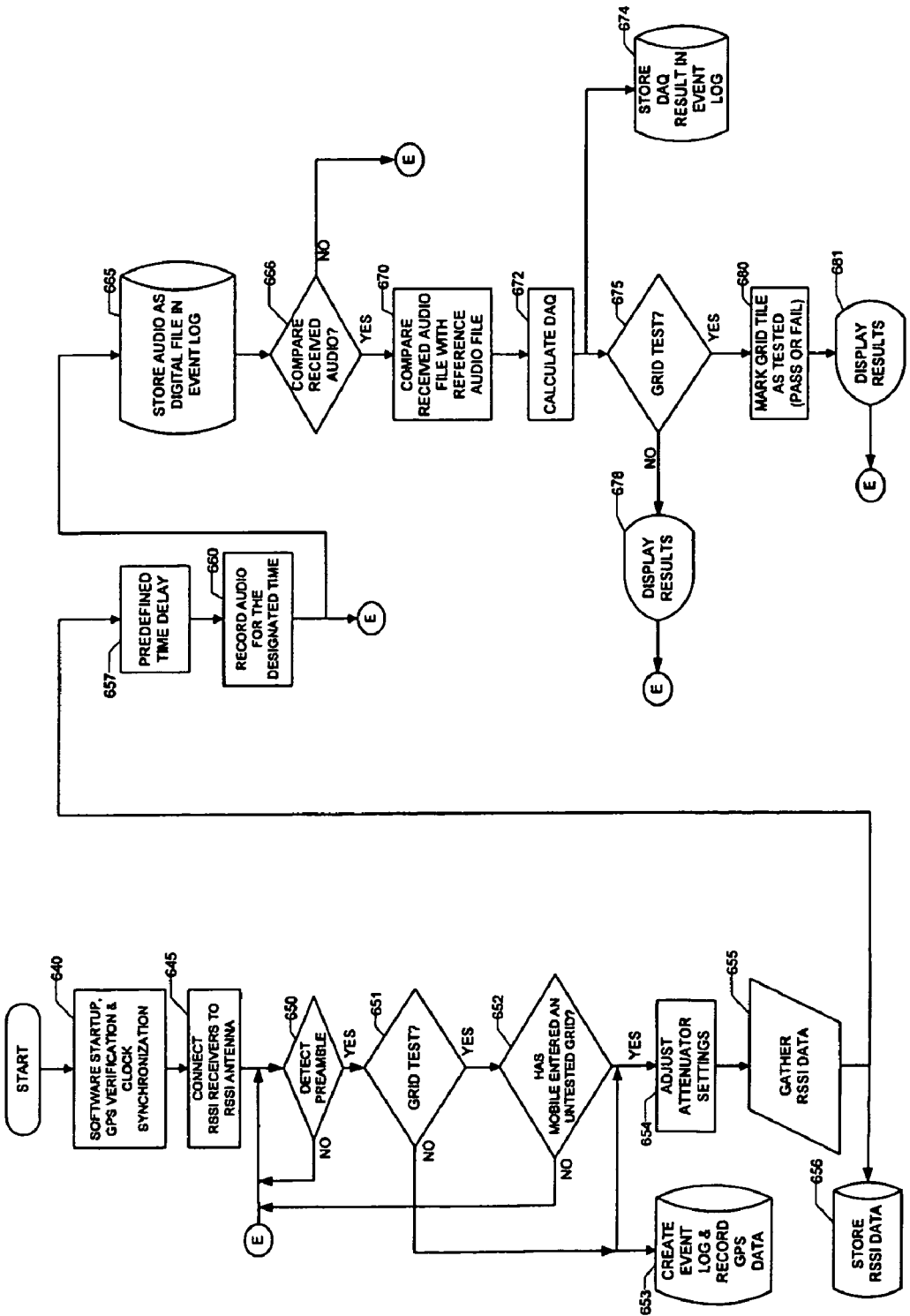
FIG. 8 illustrates the software method of the invention in block diagram form within the Mobile Apparatus when receive-only testing is selected.
Figure 9:
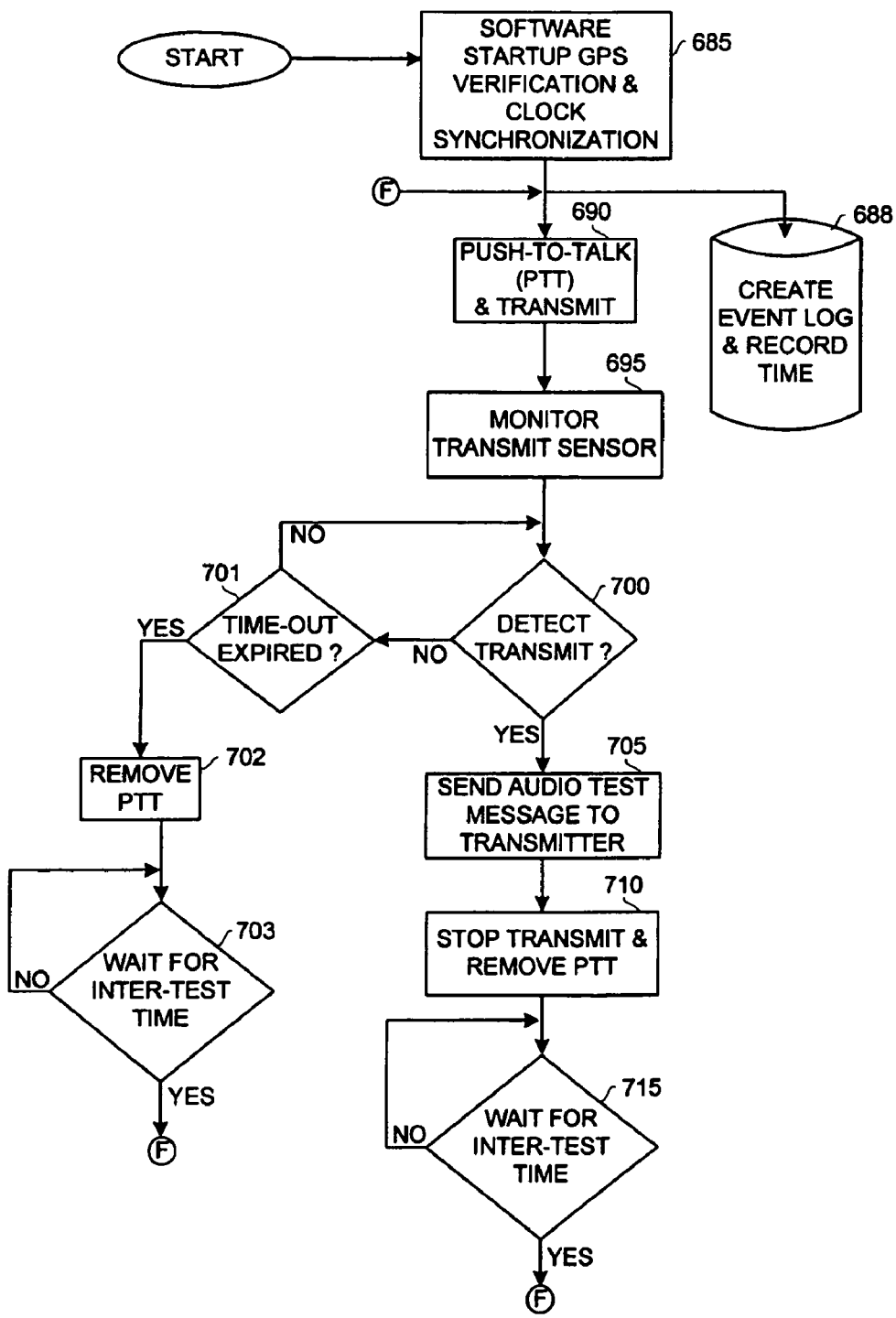
FIG. 9 illustrates the software method of the invention in block diagram form within the Fixed Apparatus when receive-only testing is selected.

FIG. 8 and FIG. 9 illustrate the software method of the invention in block diagram form when mobile receive-only testing is selected. In this mode, testing is limited to the "talk-out" direction only, i.e. from Fixed Apparatus 10 to Mobile Apparatus 5. Since there are no transmissions from Mobile Apparatus 5, the function of Fixed Apparatus 10 is confined to that of a transmitter. This arrangement enables Mobile Apparatus 5 to operate in either the grid testing mode or the continuous test mode. If grid testing is selected, the facility can be programmed to collect only the first sample in each grid cell. Alternatively, the test can record multiple calls within each grid cell—the operator would then decide later (during post-test processing) how to handle the data collected. It is even possible to collect the data in a continuous test mode, then create grids and analyze the collected test calls during post-processing. The receive-only test mode has several advantages: Test set-up is much simpler, and both test and post-processing time are greatly reduced since only half as many test calls (fixed-to-mobile apparatus only) need be made. Furthermore, since many land mobile radio vendors have relied solely on this test mode in the past, its availability as part of the facility and method of this invention enables a direct comparison to results obtained by others. Finally, the time saved by employing this test mode enables data to be collected economically for an entire test area where limited field time is available. In the receive-only test mode, both Mobile Apparatus 5 and Fixed Apparatus 10 require software startup, software initialization and GPS Synchronization as shown at 640 in FIG. 8 and at 685 in FIG. 9 before the test sequence can begin. The GPS synchronization involves verifying the correct GPS status as defined by the operator and synchronizing the system clock at Mobile control computer 30 in FIG. 2 and at Stationary control computer 170 in FIG. 3 to the respective GPS time as determined at 20 in FIG. 2 and at 160 in FIG. 3. The operator has the option to select either the grid mode or continuous mode of testing during software initialization. Once the software in both Mobile Apparatus 5 and Fixed Apparatus 10 has been initialized, the test sequence can begin.

FIG. 8 illustrates the process at Mobile Apparatus 5 when receive-only testing is selected. First RSSI Receiver 140 and second RSSI receiver 145 are connected to RSSI Antenna 135 at 645. The audio output of the Mobile test transceiver 45 is monitored for the appropriate preamble at 650. Note that there is no time-out sequence in this mode of testing—the Mobile Test Apparatus 5 will wait indefinitely for the preamble. The test sequence checks whether the grid mode was selected during software initialization at 651. If the grid test mode is desired, the position of the vehicle (determined by first GPS receiver subsystem 20) is compared at 652 with the coordinates of the map grid displayed on Mobile control computer 30. If the test vehicle has entered a grid previously marked as "tested", the sequence is restarted at E with monitoring for the preamble of the next test call. If the operator wants to allow multiple tests within a grid, this feature in the software can be disabled.

If the continuous mode of testing has been selected (determined at 651), or if the test vehicle has entered an untested grid (determined at 652), then Mobile control computer 30 creates an event log and records GPS time, location (longitude and latitude), grid index number (if applicable), and vehicle speed in the event file at 653. If testing in the grid mode, Mobile control computer 30 marks the grid index number as "tested" so that subsequent queries will indicate that the grid has been visited and tested. The GPS location (longitude and latitude) or grid index number is used to determine the proper settings for Programmable attenuator 55, and the appropriate adjustments are made at 654. First RSSI Receiver 140 and second RSSI receiver 145 gather RF signal strength data at 655 (the RSSI receivers are pre-tuned to selected frequencies during software initialization) and store the data in the event file at 656. When the audio test message preamble is detected at 650, a predefined delay (corresponding to the length of the preamble) is initiated at 657. When the predefined delay is completed, the Mobile Apparatus 5 begins recording to capture the audio portion of the message. When the pre-programmed record time has been reached at 660, the received audio record is stored in a designated directory with a unique file name in the event log at 665.

An election whether to compare the received audio file with the stored reference audio file is made during software initialization. If this option is selected at 666 (to perform the calculation "real time" as opposed to obtaining the data during post-processing), the received digital audio file is compared to a stored reference audio file at 670 using the Perceptual Evaluation of Speech Quality (PESQ algorithm as defined by ITU-T standard P.862). The result of this comparison is subjected to an empirical set of weighting factors, as described above, in order to be converted into a score for DAQ at 672. During the calculation of DAQ, a check is also performed for missing or blank audio in the recorded audio files, and such omissions are filtered out of the records so that they are not subjected to further processing. The location tested (recorded at 653) and the results of the test are stored in the event log at 674. If the grid test mode was selected (determined at 675), the grid cell tested is marked at 680 on a computer-generated map displayed on Mobile control computer 30 at 681 with either a pass or fail designation. This designation may be a color, such as green for passed and red for failed, or any other distinguishing visible indicia, such as, but not limited to, hatching, shading or inverse display or aural indicia, such as, but not limited to, differing tones or a sequence of tones. If the continuous test mode was selected during software initialization (as indicated by a "no" decision at 675), the test results are displayed on Mobile control computer 30 at 678. In either case, after display the test sequence is restarted at E.

FIG. 9 illustrates the process at Fixed Apparatus 10 when receive-only testing is selected. After Fixed Apparatus 10 software is started, initialized and the Stationary control computer 170 clock is synchronized at 685 with the GPS time, the test sequence is ready to begin. Stationary control computer 170 creates an event log and records the time in the event file at 688. A PTT sequence is initiated at 690 to place Stationary test transceiver 110 in transmit mode. The test sequence waits until a preprogrammed transmit detect time has expired at 695. (This preprogrammed transmit time is set up during software initialization.) Second Power Detect Circuit 191 is monitored to detect transmission of RF power at 700. If RF power is present at 701, then this is an indication that trunked Radio System 15 has assigned a channel or talk-path to Stationary test transceiver 110. If RF power is not present for the specified period of time, the system removes the PTT signal at 702. The test sequence is placed in a wait state at 703 for a predetermined period of time (set during software initialization). This delay gives Stationary test transceiver 110 a rest period for cool down. When the inter-test time period has expired, Fixed Apparatus 10 restarts the test sequence at F. Once the channel grant is received (by having transmit power detected for the specified period of time at 700), an audio test message is then queued up and transmitted at 705 to Mobile Apparatus 5 via Radio System 15. When the audio test message is complete (as measured by elapsed time), the PTT signal is removed from Stationary test transceiver 110, and the RF transmission is stopped at 710. The test sequence is placed in a wait state at 703 for a predetermined period of time (set during software initialization). This delay gives Stationary test transceiver 110 a rest period for cool down. When the inter-test time period has expired, Fixed Apparatus 10 begins a new test sequence at F.

Although the description of the preferred embodiment of this invention has been described here with reference to particular components, it should be understood that the functions performed by these components may also be performed in by other similar components, and that this invention is not limited by reference to the specific components disclosed. Similarly, the process steps disclosed herein are not the only way in which the function of this invention can be implemented. Other embodiments and arrangements of steps are possible so long as the overall method and advantages described above are preserved.

What is claimed is:

1. A method to evaluate the radio coverage of a radio system by employing continuous, two-way testing for an allotted period of time at multiple locations using a system including a mobile location apparatus having a mobile test transceiver, a first GPS system, a programmable attenuator, a first RSSI receiver, a second RSSI receiver, an RSSI antenna system, a mobile control computer connected to a display unit and a first event log maintained by the mobile control computer all situated in a test vehicle and a fixed location apparatus having a stationary control computer, a second GPS system, a stationary test transceiver and a second event log maintained by the stationary control computer comprising:

performing software startup and initialization and GPS synchronization for both the mobile location apparatus using the first GPS system and the fixed location apparatus using the second GPS system;
verifying that the speed of the test vehicle exceeds a pre-selected minimum speed;
storing in the first event log a GPS time, GPS location and speed of the test vehicle when the test vehicle exceeds the pre-selected minimum speed;
adjusting the programmable attenuator based on the location of the test vehicle;
determining and storing noise levels in the first event log;
placing the mobile test transceiver in transmit mode;
if no transmission occurs within a pre-set period of time, returning to verifying;
transmitting a test message having a preamble portion and an audio portion both with known, fixed durations from the mobile location apparatus to the fixed location apparatus through the radio system;
further placing the mobile test transceiver in receive mode;
detecting reception of a preamble portion at the fixed location apparatus;
recording in the second event log the time of detection of a preamble portion;
initiating recording of an audio portion at the fixed location apparatus after expiration of the known duration for a preamble portion;
stopping recording of an audio portion at the fixed location apparatus after expiration of the known duration for an audio portion;
further storing the received recorded audio portion in the second event log as a digital file with a unique identifier together with the time when the received audio portion was received at the fixed location apparatus;
if an election was made not to assign DAQ scores in real time, jumping to pausing;
comparing the received recorded audio portion with a stored reference audio file;
assigning a score for DAQ to the received recorded audio portion;
associating the location tested with the score for DAQ for that location;
yet additionally storing the assigned DAQ score and associated location in the second event log;
pausing for a pre-determined period of time, after the expiration of which, the time is stored by the stationary control computer in the second event log;
yet further placing the stationary test transceiver in transmit mode;
if no transmission occurs within a pre-determined period of time, returning to detecting;
further transmitting a test message having a preamble portion and an audio portion both with known, fixed durations from the fixed location apparatus to the mobile location apparatus through the radio system;
still further placing the stationary test transceiver in receive mode;
monitoring for reception of a preamble portion transmitted by the stationary test transceiver to the mobile test transceiver;
if no preamble is detected within a specified time period, returning to verifying;
yet further storing in the first event log the GPS time, GPS location and test vehicle speed corresponding to when the preamble portion was detected;
collecting and storing RF signal strength levels in the first event log;
further initiating recording of an audio portion at the mobile location apparatus after expiration of the known duration for a preamble portion;
further stopping recording of an audio portion at the mobile location apparatus after expiration of the known duration for an audio portion;
additionally storing the received recorded audio portion in the first event log as a digital file together with a unique identifier;
if an election was made not to assign DAQ scores in real time,
pausing for a pre-determined period of time; and returning to verifying until the allotted period of time has expired;
further comparing the received recorded audio portion with a stored reference audio file;
assigning a score for DAQ to the received recorded audio portion;
further associating the location tested with the score for DAQ for that location;
still further storing the assigned DAQ score and associated location in the first event log;
indicating on the display unit whether the location tested has passed or failed the test;
further pausing for a pre-defined time delay, and
returning to verifying until the allotted period of time has expired.

2. The method of claim 1 wherein determining and storing further comprises:
connecting the first RSSI receiver and the second RSSI receiver to the antenna system;
tuning the RSSI receivers to preprogrammed frequencies to gather noise data for one second;
storing the noise data in the mobile control computer; and
disconnecting the first RSSI receiver and the second RSSI receiver from the RSSI antenna.

3. The method of claim 1 wherein placing further comprises:
initiating a PTT signal from the mobile test transceiver;
monitoring for a pre-selected time period to detect RF power; and
if RF power is not detected during the pre-selected time period, discontinuing the PTT signal and returning to verifying.

4. The method of claim 3 wherein stopping recording further comprises:
discontinuing the PTT signal from the mobile test transceiver; and
reconnecting the first RSSI receiver and the second RSSI receiver to the RSSI antenna system.

5. The method of claim 1 wherein further stopping recording further comprises disconnecting the first RSSI receiver and the second RSSI receiver from the RSSI antenna system.

6. The method of claim 1 wherein the mobile control computer and the stationary control computer each has stored therein the same lookup table and assigning further comprises:
calculating the average root mean square amplitude of a received recorded audio portion;
if the average root mean square amplitude does not exceed 0.02,
assigning a DAQ of 0.0 to the test location;
designating the location as having failed the test; and
jumping to indicating;
calculating a Combined PESQ score for the received audio portion;
filtering out missing or blank audio from the received recorded message;
converting the PESQ score to a DAQ score by reference to the lookup table stored in the mobile control computer.

7. The method of claim 1 wherein, if the fixed location apparatus includes an optional RSSI receiver connected to an optional RSSI antenna, recording further comprises:
connecting the optional RSSI receiver to the optional RSSI antenna; and
capturing and storing RF signal strength data in the second event log.

8. The method of claim 1 wherein further placing further comprises:
initiating a PTT signal from the stationary test transceiver;
monitoring for a pre-selected time period to detect RF power; and
if RF power is not detected during the pre-selected time period, discontinuing the PTT signal and returning to verifying.

9. The method of claim 1 wherein, if an optional RSSI receiver and an optional RSSI antenna system are included with the fixed location apparatus, the RSSI receiver is disconnected after stopping recording.

10. The method of claim 1 wherein placing the stationary test transceiver in receive mode comprises:
removing the PTT signal from the stationary test transceiver and returning to detecting.

11. The method of claim 1 wherein indicating further comprises either displaying one or more colors or any other visible indicium, such as one or more selected from the group consisting of hatching, shading or inverse display or generating an aural indicium such as one or more selected from the group consisting of one tone, multiple tones or a sequence of tones.

12. A method to evaluate the radio coverage of a radio system by employing two-way testing of a predetermined number of equally sized, rectangular cells in a pre-designated geographic grid each of which is initially labeled as untested, wherein the geographic coordinates of each cell are stored in a first database and each cell is associated with a grid index number, using a system including a mobile location apparatus having a mobile test transceiver, a first GPS system, a programmable attenuator, a first RSSI receiver, a second RSSI receiver, an RSSI antenna system, a mobile control computer connected to a display and a first event log maintained by the mobile control computer all situated in a test vehicle and a fixed location apparatus having a stationary control computer, a second GPS system, a stationary test transceiver and a second event log maintained by the stationary control computer comprising:
performing software startup and initialization and GPS synchronization for both the mobile location apparatus using the first GPS system and the fixed location apparatus using the second GPS system;
verifying that the speed of the test vehicle exceeds a pre-selected minimum speed and that the vehicle has entered an untested cell;
storing in the first event log the GPS time, GPS location, grid index number and speed of the test vehicle based on the first GPS system corresponding to when the test vehicle exceeded the pre-selected minimum speed;
adjusting the programmable attenuator based on location of the test vehicle;
determining and storing noise levels in the first event log;
placing the mobile test transceiver in transmit mode;
if no transmission occurs within a pre-set period of time, returning to verifying;
transmitting a test message having a preamble portion and an audio portion both with known, fixed durations from the mobile location apparatus to the fixed location apparatus through the radio system;
further placing the mobile test transceiver in receive mode;
detecting reception of a preamble portion at the fixed location apparatus;
recording in the second event log the time of detection of a preamble portion;
initiating recording of an audio portion at the fixed location apparatus after expiration of the known duration for a preamble portion;

stopping recording of an audio portion at the fixed location apparatus after expiration of the known duration for an audio portion;
further storing the received recorded audio portion in the second event log as a digital file with a unique identifier together with the time when the received audio portion was received at the fixed location apparatus;
if an election was made not to assign DAQ scores in real time, jumping to pausing;
comparing the received recorded audio portion with a stored reference audio file;
assigning a score for DAQ to the received recorded audio portion;
associating the location tested with the score for DAQ for that location;
yet additionally storing the assigned DAQ score and associated location in the second event log;
pausing for a pre-determined period of time, after the expiration of which, the time is stored by the stationary control computer in the second event log;
yet further placing the stationary test transceiver in transmit mode;
if no transmission occurs within a pre-determined period of time, returning to detecting;
further transmitting a test message having a preamble portion and an audio portion both with known, fixed durations from the fixed location apparatus to the mobile location apparatus through the radio system;
still further placing the stationary test transceiver in receive mode;
monitoring for reception of a preamble portion transmitted by the stationary test transceiver to the mobile test transceiver;
if no preamble is detected within a specified time period, returning to verifying;
yet further storing in the first event log the GPS time, GPS location, grid index number and test vehicle speed corresponding to when the preamble portion was detected;
further adjusting the programmable attenuator based on either the geographic location or the grid index number identifying where the test vehicle is located, as preferred;
collecting and storing RF signal strength levels in the first event log;
further initiating recording of an audio portion at the mobile location apparatus after expiration of the known duration for a preamble portion;
further stopping recording of an audio portion at the mobile location apparatus after expiration of the known duration for an audio portion;
additionally storing the received recorded audio portion in the first event log as a digital file together with a unique identifier;
if an election was made not to assign DAQ scores in real time,
pausing for a pre-determined period of time; and
returning to verifying until the desired number of cells has been tested;
further comparing the received recorded audio portion with a stored reference audio file;
assigning a score for DAQ to the received recorded audio portion;
further associating the location tested with the score for DAQ for that location;
still further storing the assigned DAQ score and associated location in the first event log;
indicating on the display unit whether the cell tested has passed or failed the test by appropriately changing the label associated with that cell;
further pausing for a pre-defined time delay; and
returning to verifying until the desired number of cells has been tested.

13. The method of claim 12 wherein each cell is sized large enough to permit a moving vehicle to collect data while moving therethrough and small enough that the data collected by the moving vehicle is representative of the area contained within the cell.

14. The method of claim 12 wherein the grid containing the cells is rectangularly shaped with top and bottom boundaries parallel to each other along an east-west orientation and side boundaries parallel to each other along a north-south orientation.

15. The method of claim 12 wherein adjusting of the programmable attenuator is based on any unique conditions applicable in each cell as disclosed prior to testing and on whether a portable device hand-held at head level, clipped to a belt or supplied with a public safety speaker/microphone with shoulder-mounted antenna is to be used to perform the test.

16. The method of claim 12 wherein indicating further comprises either displaying
one or more colors or any other visible indicium, such as one or more selected from the group consisting of hatching, shading or inverse display or generating an aural indicium such as one or more selected from the group consisting of one tone, multiple tones or a sequence of tones.

17. The method of claim 12 wherein determining and storing further comprises:
connecting the first RSSI receiver and the second RSSI receiver to the RSSI antenna system;
tuning the RSSI receivers to preprogrammed frequencies to gather noise data for one second;
storing the noise data in the mobile control computer; and
disconnecting the first RSSI receiver and the second RSSI receiver from the RSSI antenna.

18. The method of claim 12 wherein further placing further comprises:
initiating a PTT signal from the mobile test transceiver;
monitoring for a pre-selected time period to detect RF power; and
if RF power is not detected during the pre-selected time period, discontinuing the PTT signal and returning to verifying.

19. The method of claim 18 wherein stopping recording further comprises:
discontinuing the PTT signal from the mobile test transceiver; and
reconnecting the first RSSI receiver and the second RSSI receiver to the RSSI antenna system.

20. The method of claim 12 wherein further stopping recording further comprises disconnecting the first RSSI receiver and the second RSSI receiver from the RSSI antenna system.

21. The method of claim 12 wherein the mobile control computer and the stationary control computer each has stored therein the same lookup table and assigning further comprises:
calculating the average root mean square amplitude of a received recorded audio portion;
if the average root mean square amplitude does not exceed 0.02, assigning a DAQ of 0.0 to the test location;

designating the location as having failed the test; and
jumping to indicating;
calculating a Combined PESQ score for the received audio portion;
filtering out missing or blank audio from the received recorded message;
converting the PESQ score to a DAQ score by reference to the lookup table stored in the mobile control computer.

22. The method of claim 12 wherein, if the fixed location apparatus includes an optional RSSI receiver connected to an optional RSSI antenna, recording further comprises:
connecting the optional RSSI receiver to the optional RSSI antenna; and
capturing and storing RF signal strength data in the second event log.

23. The method of claim 12 wherein further placing further comprises:
initiating a PTT signal from the stationary test transceiver;
monitoring for a pre-selected time period to detect RF power; and
if RF power is not detected during the pre-selected time period, discontinuing the PTT signal and returning to verifying.

24. The method of claim 12 wherein, if an optional RSSI receiver and an optional RSSI antenna system are included with the fixed location apparatus, the RSSI receiver is disconnected after stopping recording.

25. The method of claim 12 wherein placing the stationary test transceiver in receive mode comprises:
removing the PTT signal from the stationary test transceiver and
returning to detecting.

26. The method of claim 12 wherein indicating further comprises either displaying one or more colors or any other visible indicium, such as one or more selected from the group consisting of hatching, shading or inverse display or generating an aural indicium such as one or more selected from the group consisting of one tone, multiple tones or a sequence of tones.

27. A method to evaluate the radio coverage of a radio system through either mobile, receive-only, one-way testing of a pre-determined number of equally sized, rectangular cells in a pre-designated geographic grid each of which is initially labeled as untested, wherein the geographic coordinates of each cell are stored in a first database and each cell is associated with a grid index number, or mobile, receive-only, one-way continuous testing for an allotted period of time at multiple locations as selected by an operator, in both cases using a system including a mobile location apparatus having a mobile test transceiver, a first GPS system, a programmable attenuator, a first RSSI receiver, a second RSSI receiver, an RSSI antenna system, a mobile control computer connected to a display unit and a first event log maintained by the mobile control computer situated in a test vehicle and a fixed location apparatus having a stationary control computer, a second GPS system, a stationary test transceiver and a second event log maintained by the stationary control computer comprising:
performing software startup and initialization and GPS synchronization for both the mobile location apparatus using the first GPS system and the fixed location apparatus using the second GPS system;
connecting first RSSI receiver and second RSSI receiver to the RSSI antenna system;
selecting either grid testing or continuous testing;
placing the mobile test transceiver in receive mode;
monitoring for reception of a preamble portion transmitted by the stationary test transceiver to the mobile test transceiver;
storing the time in the second event log based on the second GPS system;
further placing the stationary test transceiver in transmit mode;
if no transmission occurs within a pre-determined period of time,
taking the stationary test transceiver out of transmit mode;
waiting for a pre-specified period of time; and
returning to further placing;
transmitting a test message having a preamble portion and an audio portion both with known, fixed durations from the fixed location apparatus to the mobile location apparatus through the radio system;
pausing for a pre-determined period of time;
further returning to placing until all cells have been tested, if grid testing was selected, or until a specified period of time has elapsed, if continuous testing was selected;
if grid testing has been selected,
ascertaining the geographic position of the test vehicle and, if the test vehicle has entered a cell previously tested, indicating the cell has been tested by appropriately changing the label associated with that cell and returning to monitoring;
further storing in the first event log the GPS time, GPS location, grid index number, if applicable, and speed of the test vehicle based on the first GPS system corresponding to when the preamble portion was detected;
adjusting the programmable attenuator based on the location of the test vehicle;
gathering and storing RF signal strength data in the first event log;
initiating recording of an audio portion at the mobile location apparatus after expiration of the known duration for a preamble portion;
stopping recording of an audio portion at the mobile location apparatus after expiration of the known duration for an audio portion;
yet further storing the received recorded audio portion in the first event log as a digital file with a unique identifier together with the time when the received audio portion was received at the mobile location apparatus;
if an election was made not to assign DAQ scores in real time,
returning to monitoring until the desired number of cells has been tested or the allotted period of time has expired;
comparing the received recorded audio portion with a stored reference audio file;
assigning a score for DAQ to the received recorded audio portion;
associating the location tested with the score for DAQ for that location;
still further storing the assigned DAQ score and associated location in the first event log;
indicating on the display unit whether the cell or location tested has passed or failed the test by appropriately changing the label and information associated with that cell;
further returning to monitoring until the pre-determined number of cells has been tested or the allotted period of time has expired.

28. The method of claim 27 wherein, if grid testing has been selected, further comprises deciding whether to allow multiple tests within individual cells in the grid and, if so, jumping to storing.

29. The method of claim 27 wherein indicating further comprises either displaying one or more colors or any other visible indicium, such as one or more selected from the group consisting of hatching, shading or inverse display or generating an aural indicium such as one or more selected from the group consisting of one tone, multiple tones or a sequence of tones.

30. The method of claim 27 wherein ascertaining further comprises comparing the location of the test vehicle as determined by the first GPS system with the coordinates for each cell in the grid as stored in the first database.

31. The method of claim 27 wherein further placing further comprises:
    initiating a PTT signal from the mobile test transceiver;
    monitoring for a pre-selected time period to detect RF power; and
    if RF power is not detected during the pre-selected time period, discontinuing the PTT signal and returning to verifying.

32. The method of claim 27 wherein the mobile control computer has stored therein a lookup table and assigning further comprises:
    calculating the average root mean square amplitude of a received recorded audio portion;
    if the average root mean square amplitude does not exceed 0.02,
        assigning a DAQ of 0.0 to the test location;
        designating the location as having failed the test; and
        jumping to indicating;
    calculating a Combined PESQ score for the received audio portion;
    filtering out missing or blank audio from the received recorded message;
    converting the PESQ score to a DAQ score by reference to the lookup table.

* * * * *